United States Patent Office 3,259,616
Patented July 5, 1966

3,259,616
POLYPEPTIDES
Robert Schwyzer and Beat Iselin, Riehen, Heini Kappeler, Birsfelden, Werner Rittel, Basel, and Bernhard Riniker, Reinach, Switzerland, assignors to Ciba Corporation, a corporation of Delaware
No Drawing. Filed Jan. 19, 1961, Ser. No. 83,632
Claims priority, application Switzerland, Sept. 6, 1956, 37,189/56; Feb. 8, 1957, 42,508/57; Mar. 6, 1957, 43,519/57; Apr. 4, 1957, 44,616/57; July 31, 1957, 49,007/57
18 Claims. (Cl. 260—112.5)

This is a continuation-in-part of our application Ser. No. 680,922, now abandoned, and Ser. No. 680,904 now U.S. Patent No. 2,978,444, both filed on August 29, 1957.

The present invention relates to a new decapeptide, which has the property of causing a rise in blood pressure similar to that of hypertensin, but which is effective for a longer period, and can be converted into hypertensin by hydrolysis. In this way it becomes possible for the first time to synthesize the latter hormone. This fact is in itself sufficient to indicate the importance of the present invention, especially when it is realized that hitherto hypertensin could be obtained only by isolating it from the blood by a complicated extraction process, only about 5 milligrams of this polypeptide being obtained from 100 kilograms of blood. The new decapeptide is L-asparaginyl-L-arginyl - L - valyl - L - tyrosyl-L-valyl-L-histidyl-L-prolyl-L-phenylalanyl-L-histidyl-L-leucine of the formula

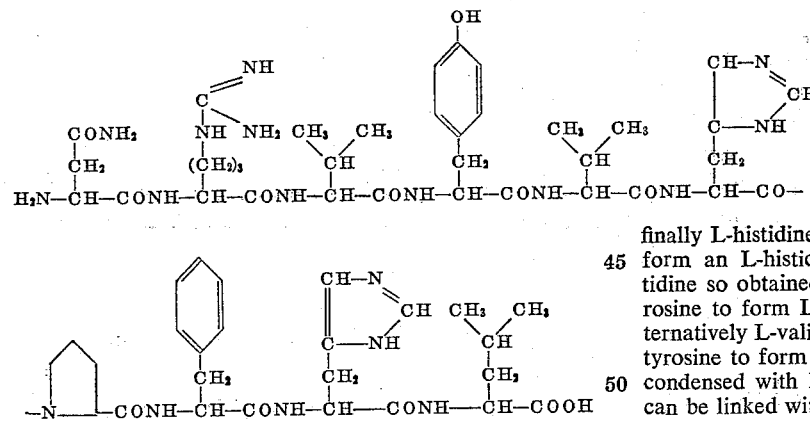

It differs from hypertensin in that its molecule contains the radical of asparagine instead of the radical of aspartic acid.

As will be apparent from the foregoing formula, there are many possible ways of synthesizing the new polypeptide.

It has been found of advantage to use as starting materials an L-asparagine, of which the amino group is protected by a radical capable of being split off by reduction or hydrolysis, and an L-arginine, of which the amino group of the amidine group is protected by a radical capable of being split up by hydrolysis or reduction, advantageously a nitro group, and to link together in amide-like manner the radicals of an L-asparagine having the protected amino group, of an L-arginine having the protected amidino group, of L-valine, of an L-tyrosine having a free or substituted hydroxyl group, such as an ester or ether thereof, of L-valine, of L-histidine, of L-proline, of L-phenyl-alanine, of L-histidine and of an L-leucine ester so as to form a decapeptide having the aforesaid sequence of amino-carboxylic acid radicals, then to liberate in the polypeptide so obtained the esterified carboxyl group of the leucine radical, the protected amino groups of the asparagine and arginine radicals and, if desired, a substituted hydroxyl group of the tyrosine radical and, if desired, to convert the carboxylic acid amide group of the asparagine radical into a free carboxyl group.

In an advantageous form of the process nitro-L-arginine is acylated with an L-asparagine containing a protected amino group. L-asparaginyl-nitro-L-arginine so obtained is then condensed with an L-valyl-L-tyrosyl-L-valyl-L-histidyl-L-prolyl-L-phenylalanyl-L-histidyl-L-leucine ester to form the desired decapeptide. Alternatively, an L-asparaginyl-nitro-L-arginine is condensed with L-valyl-L-tyrosyl-L-valyl-L-histidine to form an asparaginyl-nitro-L-arginyl-L-valyl-L-tyrosyl-L-valyl-L-histidine and the latter is reacted with an L-prolyl-L-phenylalanyl-L-histidyl-L-leucine ester to form the decapeptide. It is also possible to acylate L-valyl-L-tyrosyl-L-valyl-histidine with an L-asparaginyl-nitro-L-arginine and react the L-asparaginyl-nitro-L-arginyl-L-valyl-L-tyrosyl-L-valyl-L-histidine so obtained with L-prolyl-L-phenylalanine to form the octapeptide, which is used for acylating an L-histidyl-L-leucine ester to form the decapeptide.

The aforesaid polypeptides used in the acylation can be obtained in various ways. Thus, for example, first of all L-valine may be condensed with L-tyrosine to form L-valyl-L-tyrosine, L-valine is condensed with L-histidine to form L-valyl-L-histidine, L-proline is condensed with L-phenylalanine to form L-prolyl-L-phenylalanine, and finally L-histidine is condensed with an L-leucine ester to form an L-histidiyl-L-leucine ester. The L-valyl-L-histidine so obtained is then acylated with the L-valyl-L-tyrosine to form L-valyl-L-tyrosyl-L-valyl-L-histidine. Alternatively L-valine may be condensed with the L-valyl-L-tyrosine to form L-valyl-L-tyrosyl-L-valine and the latter condensed with histidine. The L-prolyl-L-phenylalanine can be linked with an L-histidyl-L-leucine ester to form a prolyl-L-phenylalanyl-histidyl-leucine ester. The same polypeptide can also be obtained by acylating L-histidine with L-prolyl-L-phenylalanine and reacting the resulting tripeptide with an L-leucine ester.

In carrying out the aforesaid acylations the known methods for preparing polypeptides may be used. Free amino groups which are not intended to take a part in the reaction must be temporarily protected, especially by radicals capable of being split off by hydrolysis such, for example, as the carbo-benzyloxy or the trityl radical. The amino-acids to be acylated are advantageously used in the form of their esters, for example methyl or ethyl ester. As methods of acylation there may be mentioned the reaction of an acid with an appropriate phosphite-amide, for example, the appropriate diethyl phosphite-amide; the reaction of an acid with the amine in the presence of a carbo-diimide, such as 1-cyclohexyl-3-(2-morpholinyl-(4)-ethyl)-carbo-diimide; and especially the reaction of an amine with an activated ester in which the activating substituent present in the alcohol component is advantageously a cyano or nitro group.

A special form of the process, as described in the earlier of the following examples, is represented by the following scheme:

1a. *Diethylphosphite-amide (III) of nitro-L-arginine methyl ester (II):*

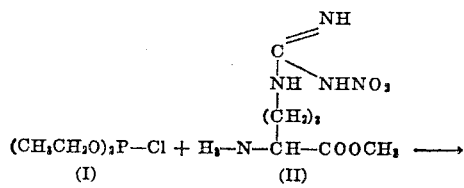

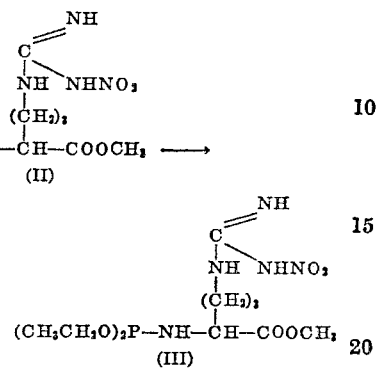

1b. *N - carbobenzyloxy - L-asparaginyl-nitro-L-arginine methyl ester (V):*

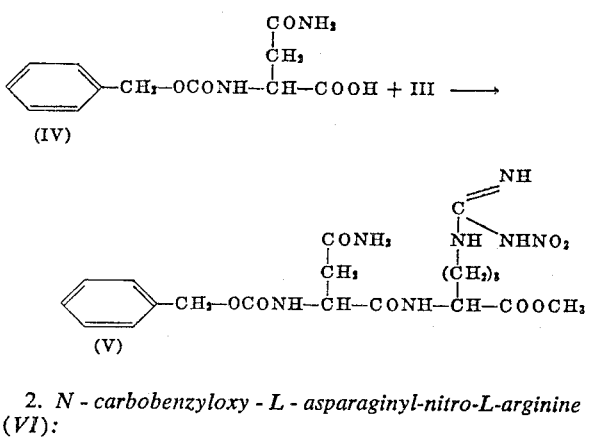

2. *N - carbobenzyloxy - L - asparaginyl-nitro-L-arginine (VI):*

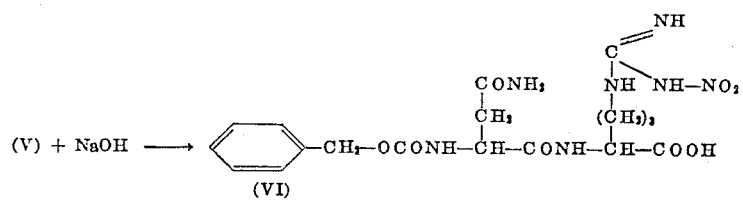

3. *N - carbobenzyloxy-L-asparaginyl-nitro-L-arginyl-L-valyl-L-tyrosyl-L-valyl-L-histindine methyl ester (VIII):*

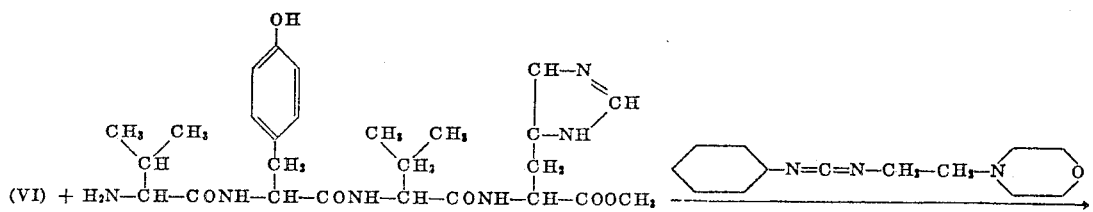

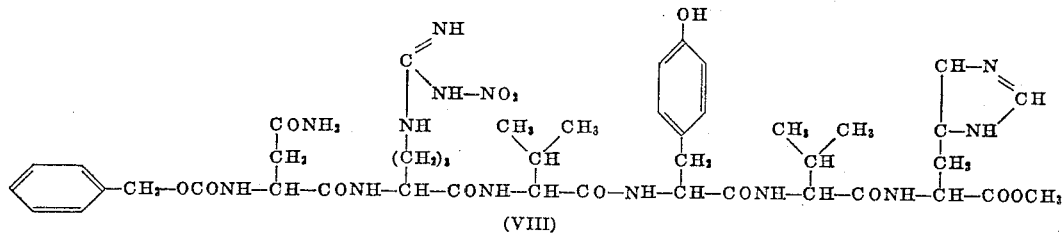

4. *N - carbobenzyloxy-L-asparaginyl-nitro-L-arginyl-L-valyl-L-tyrosyl-L-valyl-L-histindine (IX):*

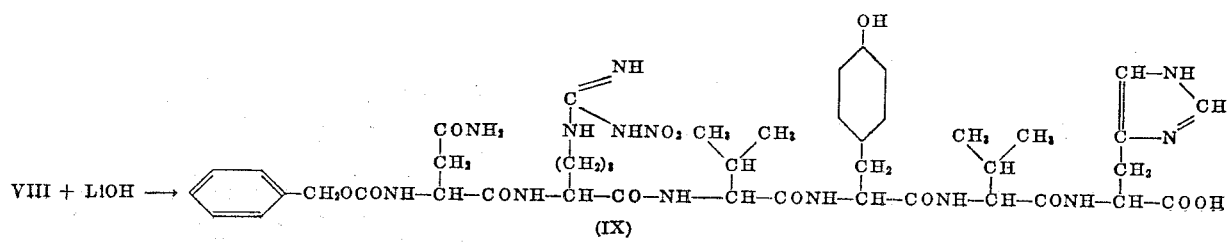

5. *N - carbobenzyloxy-L-asparaginyl-nitro-L-arginyl-L-valyl - L-tyrosyl-L-valyl-L-histidyl-L-prolyl-L-phenylalan-yl-L-histidyl-L-leucine methyl ester (XI):*

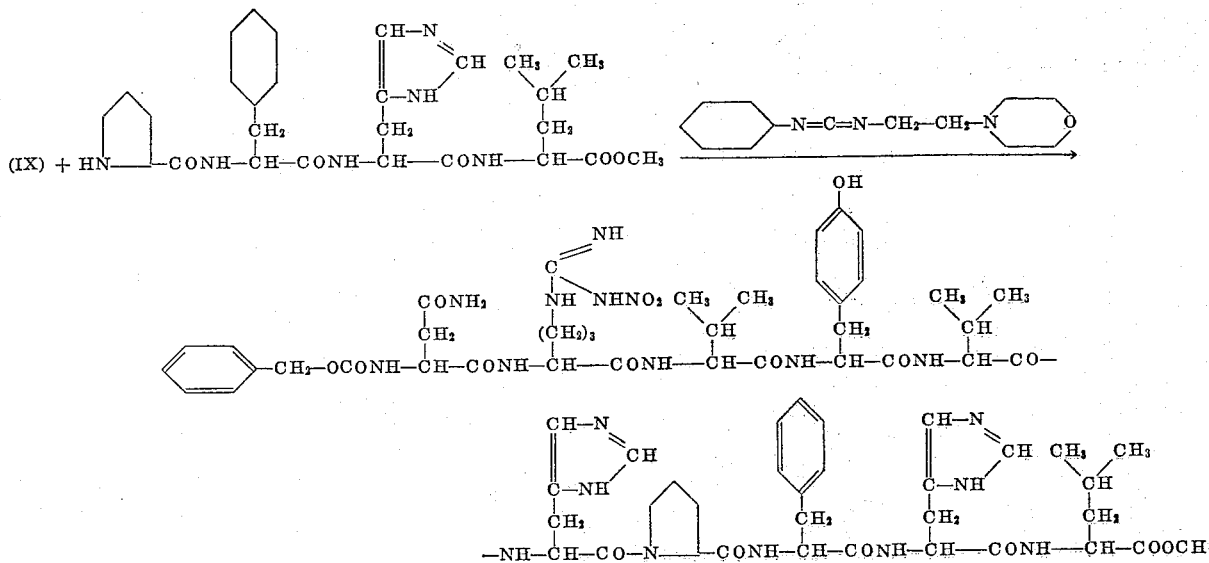

6. *L - asparaginyl - L-arginyl-L-valyl-L-tyrosyl-L-valyl-L - histidyl - L - prolyl-L-phenylalanyl-L-histidyl-L-leucine methyl ester (XII):*

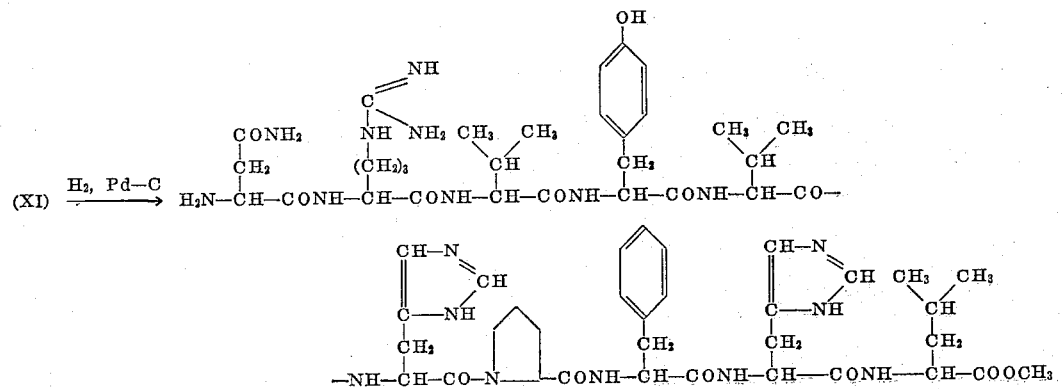

7. *L - asparaginyl - L - arginyl - L - valyl - L - tyrosyl-L - valyl - L - histidyl - L - prolyl - L - phenylalanyl - L-histidyl - L - leucine (XIII):*

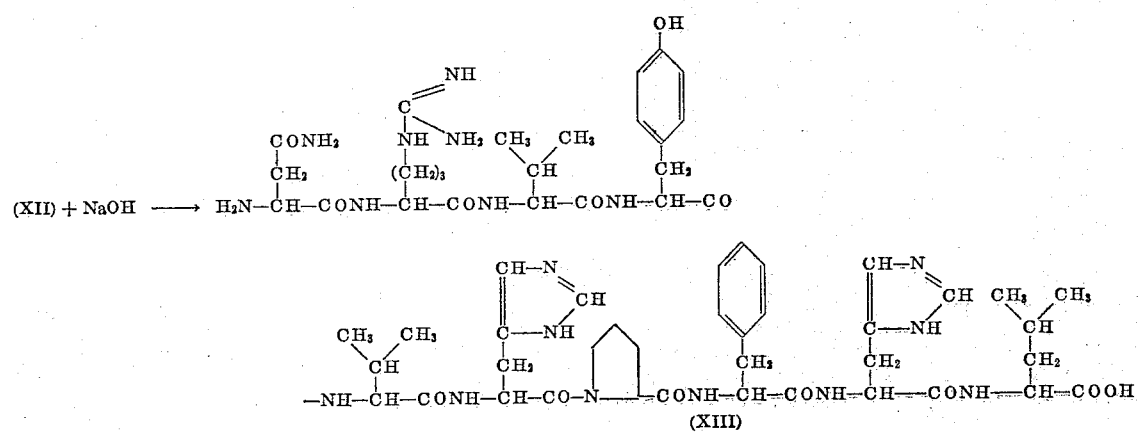

8. *Hypertensin*:

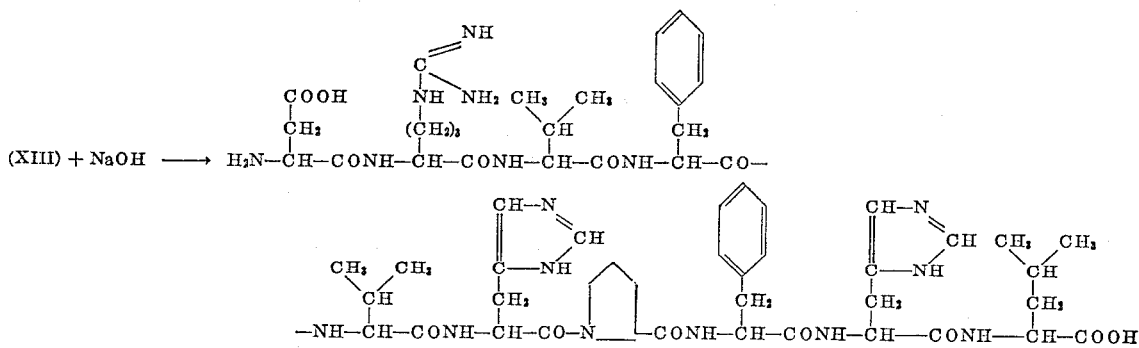

The present invention relates also to the production of octapeptides having the action of hypertensin. As is known, hypertensin is a hormone having the action of increasing the blood pressure, which was first obtained from bovine blood. Investigation of the constitution of hypertensin has shown that it is a linear decapeptide having the amino-acid sequence L-asparaginic acid, L-arginine, L-valine, L-tyrosine, L-valine, L-histidine, L-proline, L-phenylalanine, L-histidine, L-leucine. In the series two further hypertensins have been found, namely hypertensin I which occurs in equine blood and contains instead of the radical of the fifth amino-acid (valine) the radical of iso-leucine, and hypertensin II which is an octapeptide of similar structure to hypertensin I, but does not contain the two final amino-acid radicals.

The present invention is based on the observation that octapeptides having the amino-acid sequence L-asparagine, L-α-amino-(amino-lower alkyl)-acetic acid, L-α-amino-lower alkyl acetic acid, L-tyrosine, L-α-amino-lower alkyl acetic acid, L-histidine, L-proline, L-phenylalanine also possess a very good hypertensive action, and also that functional derivatives of these compounds, for example, the N-acyl-asparaginyl-octapeptides or octapeptides obtained as intermediate products in the process, and of which the amino group of the amidine radical is nitrated or the terminal carboxyl group is esterified, are also active and useful in the same respect. The activity also persists when the octapeptide molecule is simultaneously functionally converted at several places in the manner described above. This is important because the said intermediate products are more easily and therefore more cheaply obtained. The same applies to the use of the octapeptides in general as compared with the known decapeptides, and especially in the case of octapeptides which contain, instead of the valyl radical, the radical of a more easily obtainable amino-acid. The use of an octapeptide which contains the asparagine radical, instead of the asparaginic acid radical, likewise entails an improvement from the point of view of the method of production.

The aforesaid octapeptides can also be used as intermediate products for the manufacture of other active compounds. Thus, for example, the amide radical of asparagine can be converted by being subjected to the prolonged action of an acid or an alkali into the carboxyl group. By starting from L-asparaginyl-L-arginyl-L-valyl-L-tyrosyl-L-isoleucyl-L-histidyl-L-prolyl-L-phenylalanine hypertensin II is obtained, which is the first synthesis of this hormone to be described.

In the structure of the new octapeptides there are included among radicals of α-amino-lower alkyl-acetic acids principally valyl and nor-valyl, and also leucyl, iso-leucyl and nor-leucyl and also alanyl, so that the radicals of natural amino-acids are preferred. The amino group of the lower alkyl group in the above mentioned α-amino-(amino-lower alkyl)-acetic acids may be substituted, e.g., by an amidino or carbamyl group; free amino groups may be protected, preferably by a radical which can be split off by hydrolysis or reduction, such as the tosyl radical. α-Amino-(amino-lower alkyl)-acetic acids are for example, arginine, lysine, ornithine, α,γ-diamino-butyric acid or citrulline.

There are very many ways of producing the new peptides. Preferably there are used as starting materials an L-asparagine, of which the amino group is protected by a radical capable of being split off by reduction or hydrolysis, and an L-arginine, of which the amino group of the amidine group is protected by a radical capable of being split off by hydrolysis or reduction, advantageously a nitro group, and the radicals of an L-asparagine having a protected amino group, of an L-arginine having a protected amidino-group, of an L-α-amino-lower alkyl-acetic acid, of an L-tyrosine having a free or substituted hydroxyl group, such as an ester or ether thereof, of an L-α-amino lower alkyl-acetic acid, of L-histidine, of L-proline and of an L-phenylalanine ester are linked together in amide fashion to form an octapeptide having the aforesaid sequence of amino-acid radicals, in the polypeptide so obtained the esterified carboxyl group of the phenylalanine radical, the protected amino groups of the asparagine and arginine radicals and, if desired, a substituted hydroxyl group of the tyrosine radical, are set free, and, if desired, the carbonyl-amide group of the asparagine radical is converted into a free carboxyl group.

In a preferred form of the process nitro-L-arginine is acylated with an L-asparagine containing a protected amino group. The L-asparaginyl-nitro-L-arginine so obtained may then be condensed with an L-α-amino-lower alkyl-acetyl-L-tyrosyl-L-α-amino-lower alkyl-acetyl-L-histidyl-L-prolyl-L-phenylalanine ester to form the desired octapeptide. Alternatively, an L-asparginyl-nitro-L-arginine may be condensed with an L-α-amino-lower alkyl-acetyl-L-tyrosine to form an asparginyl-nitro-L-arginyl-L-α-amino-lower alkyl-acetyl-L-tyrosine, and the latter is reacted with an L-α-amino-lower alkyl-acetyl-L-histidyl-L-prolyl-L-phenylalanine ester to form the octapeptide. It is also possible to acylate and L-α-amino-lower alkyl-acetyl-L-tyrosyl-L-α-amino-lower alkyl-acetyl-histidine with an L-asparaginyl-nitro-L-arginine, and to react the 1-asparaginyl-nitro-L-arginyl-L-α-amino-lower alkyl-acetyl-L-tyrosyl-L-α-amino-lower alkyl-acetyl-histidine with L-prolyl-L-phenylalanine to form the octapeptide.

The polypeptides used in the acylation can be obtained in various ways. Thus, first L-α-amino-lower alkyl-acetic acid may be condensed with L-tyrosine to form an L-α-amino-lower alkyl-acetyl-L-tyrosine and with L-histidine to form an L-amino-lower alkyl-acetyl-L-histidine, and finally-L-proline is condensed with L-phenylalanine ester to form the L-prolyl-L-phenylalanine ester. The L-α-amino-lower alkyl-acetyl-L-histidine so obtained is then acylated with L-α-amino-lower alkyl-acetyl-L-tyrosine to form the L-α-amino-lower alkyl-acetyl-L-tyrosyl-L-α-amino-lower alkyl-acetyl-L-histidine. Alternatively the L-α-amino-lower alkyl-acetic acid may be condensed with the L-α-amino-lower alkyl-acetyl-L-tyrosine to form the Lα-amino-lower alkyl-acetyl-L-tyrosyl-L-α-amino-lower alkyl-acetic acid and the latter is condensed with L-histidine.

In the above acylations there may be used the methods known for the production of polypeptides. Free amino groups which are not to take part in the reaction must be temporarily protected, especially by means of radicals capable of being split off by hydrolysis, for example, the carbobenzyloxy radical. The amino-acids to be acylated are advantageously used in the form of their esters. As methods of acylation there may be mentioned the reaction of an acid with the corresponding phosphite-amide, for example, with the corresponding diethyl phosphite-amide, the reaction of an acid with the amine in the presence of a carbo-diimide, such as in the presence of 1-cyclohexyl - 3 - (2 - morpholinyl-(4)-ethyl)-carbo-diimide, and especially the reaction of an amine with an activated ester in which there is advantageously present as an activating substituent in the alcohol component the cyano or nitro group.

The conversion of a protected amino group into a free amino group, and also the conversion of a functionally converted carboxyl group into a free carboxyl group in the course of the process for making the various polypeptides, and especially in the octapeptides obtained by the process, are carried out by methods in themselves known by treatment with hydrolysing or reducing agents.

In the products obtained by the process free carboxyl groups may be functionally converted, especially into esters or amides. It is also possible to substitute free amino groups, for example, by alkylation or acylation. The products of the process may be obtained or used in the form of their salts.

The invention also includes any modification of the process in which there is used as starting material an intermediate product obtainable at any stage of the process and the remaining stages are carried out.

The polypeptides obtained by the process of this invention and their functional derivatives can be used as intermediate products for the manufacture of medicaments or they may be used as medicaments in the form of pharmaceutical preparations. These preparations contain the peptide in admixture with a pharmaceutical organic or inorganic carrier suitable for enteral, parenteral or local administration. For making the carrier there are used substances which do not react with the polypeptide, for example, gelatine, lactose, glucose, sodium chloride, starches, magnesium stearate, talc, vegetable oils, benzyl alcohols, gums, polyalkylene glycols, white petroleum jelly, cholesterol or other konwn carrier for medicaments. The pharmaceutical preparations may be, for example, in the form of tablets, dragees, powders, salves, creams or suppositories, or in liquid form as solutions, suspensions or emulsions. If desired, they may be sterilized and/or may contain auxiliary substances, such as preserving, stabilizing, wetting or emulsifying agents. They may also contain other therapeutically valuable substances.

The following examples illustrate the invention. Examples 1–23 concern the production of L-asparaginyl-L-arginyl - L - valyl-L-tyrosyl-L-valyl-L-histidyl-L-prolyl-L-phenylalanyl-L-histidyl-L-leucine; Examples 24–36 relate to the production of L-asparaginyl-L-arginyl-L-valyl - L - tyrosyl-L-isoluecyl-L-histidyl-L-prolyl-L-phenylalaine; Examples 37–41 illustrate the production of L - asparaginyl - L - arginyl-L-valyl-L-tyrosyl-L-valyl-L-histidyl-L-prolyl-L-phenylalanine; Examples 42–51 illustrate the production of L-asparaginyl-L-arginyl-L-valyl-L - tyrosyl-L-leucyl-L-histidyl-L-prolyl-L-phenyl-alanine. Examples 52–56 illustrate the production of L-asparaginyl - L - lysyl - L - valyl-L-tyrosyl-L-leucyl-L-histidyl-L-prolyl-Lphenylalanine; Examples 57–63 the production of L-asparaginyl-L-arginyl-L-leucyl-L-tyrosyl-L-isoleucyl-L-histidyl-L-prolyl-L-phenylananine. These compounds can be hydrolysed to the corresponding asparagyl-octa- or deca-peptides by treatment with an aqueous or alcoholic solution of an alkali, for example, caustic soda solution in methanol, or with aqueous or alcoholic solutions of mineral acids.

Example 1 a. *Diethylphosphite-amide (III) of nitro-L-arginine methyl ester.*—A cooled solution of 9.00 grams (0.042 mol) of 75 percent diethylchlorophosphite (I) in 20 cc. of absolute dioxane is added to a solution of 8.50 grams (0.037 mol) of nitro-L-arginine methyl ester (II) and 8.0 cc. (0.057 mol) of triethylamine in 100 cc. of absolute dioxane at 5° C. A thick precipitate of triethylamine hydrochloride separates out immediately. The crystals are filtered off with suction at 20° C. after one hour and washed with a small amount of absolute dioxane. After being evaporated and dried the dioxane solution yields a residue of 12.52 grams of the crude diethyl phosphite-amide (III) of nitro-L-arginine methyl ester in the form of a viscous colorless oil, which is immediately worked up as described below.

b. *N - carbobenzyloxy-L-asparaginyl - nitro-L-arginine methyl ester (V).*—12.52 grams (about 0.035 mol) of the crude oily diethyl phosphite-amide (III) of nitro-L-arginine methyl ester are dissolved in 40 cc. of diethyl phosphite and 8.00 grams (0.030 mol) of well dried finely powdered N-carbobenzyloxy-L-asparagine (IV) are added. The clear solution is maintained at 80° C. for two hours, and then the diethylphosphite is removed as completely as possible in a high vacuum. The residue is mixed with 30 cc. of water, whereupon a thick oil separates out. The oil and aqueous phase are passed through four separating funnels in each of which they are mixed with 250 cc. of ethyl acetate, whereupon the oily material slowly dissolves in the ethyl acetate. The ethyl acetate solutions are washed in succession with a small amount of dilute hydrochloric acid, sodium sulfate solution, sodium carbonate solution and sodium sulfate solution, dried over sodium sulfate and are evaporated to yield 7.00 grams of a resin. By recrystallizing the latter from water there are obtained 3.63 grams of the Compound V in the form of needles melting at 150–165° C., and the yield is 25 percent of the theoretical yield. No further crystals can be obtained from the mother liquor.

The crude crystals, after repeated recrystallization from water, melt at 170–173° C., and have the specific rotation $[\alpha]_D = +5° \pm 2°$ (c.=2.0 in glacial acetic acid). The product is soluble in methanol, dimethyl-formamide and hot water, and is sparingly soluble in cold water, ethyl acetate and tetrahydrofurane.

Example 2.—N-carbobenzyloxy-L-asparaginyl-nitro-L-arginine (VI)

4.74 grams (0.0099 mol) of the Compound V melting at 165–170° C. are mixed with 11.0 cc. of caustic soda solution (1-Normal) and the mixture is agitated at 22° C. for one hour. After about 15 minutes the greater part of the mixture has dissolved. After a further 15–20 minutes a voluminous precipitate (sodium salt of Compound VI) begins to separate out. Finally the precipitate is dissolved by the addition of 20 cc. of water, a trace of undissolved material is removed by filtration, and then carbon dioxide is passed through the solution until the pH value is 8.5.

The aqueous phase is then washed twice with 80 cc. of ethyl acetate on each occasion, and the ethyl acetate solutions are washed once with a small amount of sodium bicarbonate solution.

The aqueous phase and the bicarbonate washing liquor are mixed together, then mixed with 2 N-hydrochloric acid to give a pH value of 1, whereupon amorphous material separates out. The latter is dissolved by extraction four times with 250 cc. of ethyl acetate on each occasion. The ethyl acetate solutions are washed twice with a small amount of sodium sulfate solution, dried over sodium sulfate and yield, upon evaporation, 4.46 grams of a partially crystalline residue. By crystallization from acetonitrile there is obtained a total of 3.26 grams of Compound VI in the form of clusters of needles melting at 94–98° C. (71 percent of the theoretical yield). After recrystallization twice from acetonitrile, the product melts at 98–101° C., and has the specific rotation $$[\alpha]_D = +10° \pm 4°$$

(c.=1.4 in methanol).

The crystals are soluble in methanol, dimethyl-formamide, hot acetonitrile and hot water, and are sparingly, soluble in cold water and acetonitrile, ethyl acetate, tetrahydrofurane and acetone; and easily soluble in a saturated solution of sodium bicarbonate.

*Example 3.—N - carbobenzyloxy-L-asparaginyl-nitro-L-arginyl - L - valyl-L-tyrosyl-L-valyl-L-histidine methyl ester (VIII)*

A solution of 2.05 grams (3.87 mmol) of L-valyl-L-tyrosyl-L-valyl-L-histidine methyl ester (VII) (melting at 191–193°) in 3 cc. of dimethyl-formamide is added to a solution of 2.07 grams (4.43 mmol) of compound VI (melting at 98–103° C.) and 1.20 grams (5.07 mmol) of 1-cyclohexyl-3-(2-morpholinyl-(4)-ethyl)-carbodiimide in 5 cc. of dimethylformamide. After maintaining the mixture for 24 hours at 22° C., the dimethyl-formamide is distilled off in a high vacuum at a bath temperature of 50° C. and the residue is triturated with 8 cc. of water. The undissolved powder is filtered off with suction and washed with a small amount of water. It is then suspended in 6 cc. of 1 N-hydrochloric acid, whereupon a gelatinous precipitate (the hydrochloride of Compound VIII) which is difficult to filter is formed. The latter is centrifuged, and the glass centrifuge vessel is washed once with a small amount of 1 N-hydrochloric acid, twice with a small amount of water and dilute sodium carbonate solution, then again with water and finally with acetone, and then filtered off with suction in acetone and dried. There are obtained 1.22 grams (32 percent of the theoretical yield) of Compound VIII in the form of a slightly brownish powder melting at 170–180° C. The product is soluble in dimethyl-formamide, somewhat soluble in methanol, and sparingly soluble in acetone and water. The powder can be dissolved by the addition of a small amount of dilute hydrochloric acid and a large amount of water, and is precipitated from the resulting solution by the addition of stronger (for example 2 N) hydrochloric acid, in the form of its hydrochloride.

The L-valyl-L-tyrosyl-L-valyl-L-histidine methyl ester used as starting material is obtained as described below.

*Example 4.—N-carbobenzyloxy-L-asparaginyl-nitro-L-arginyl-L-valyl-L-tyrosyl-L-valyl-L-histidine (IX)*

800 milligrams (0.82 mmol) of Compound VIII are dissolved with the aid of heat in 8.0 cc. of dimethyl-formamide, the solution is cooled to room temperature, and 2.5 cc. of a 1 N-solution of lithium hydroxide in water are added. After maintaining the mixture for 90 minutes at room temperature, a trace of undissolved material is filtered off, and the solution is washed with a small amount of dimethyl-formamide, and 2.5 cc. of 1 N-hydrochloric acid are added (pH 3). The solution is then evaporated in a high vacuum to dryness at a bath temperature of 50° C., and the resin which remains behind is triturated with a small amount of methanol. The undissolved powder is filtered off with suction, washed with a small amount of methanol and dried. There are obtained 350 milligrams (44 percent of the theoretical yield) of Compound IX in the form of a colorless powder melting at 185–195° C.

The product is somewhat soluble in water and methanol, and sparingly soluble in acetone. When 1 N-sodium carbonate solution is added thereto a clear solution is obtained.

*Example 5.—N - carbobenzyloxy - L-asparaginyl-nitro-L-arginyl - L - valyl - L - tyrosyl - L - valyl - L - histidyl-L - prolyl - L - phenylalanyl - L - histidyl - L - leucine methyl ester (XI)*

350 milligrams (0.36 mmol) of Compound IX are dissolved with the aid of heat in 4 cc. of dimethyl-formamide, then cooled to room temperature and a solution of 110 milligrams (0.46 mmol) of 1-cyclohexyl-3-(2-morpholinyl-(4)-ethyl)-carbodiimide in 0.5 cc. of dimethyl-formamide is added. 216 milligrams (0.41 mmol) of L-prolyl-L-phenyl-alanyl-L-histidyl-L-leucine methyl ester (X) (amorphous) are then added in one portion and the solution is allowed to stand for 24 hours at 30° C. A trace of undissolved material is filtered off, the dimethyl-formamide is distilled off completely in a high vacuum, and the dry residue (resin) is washed with a small amount of 1 N-sodium carbonate solution and then with a small amount of water, and dried. The dry powder is then further washed three times with a small amount of methanol. After being dried, there are obtained 100 milligrams of Compound XI in the form of a slightly brownish powder melting at 185–195° C. and sintering from about 160° C. (90 percent yield).

The product is soluble in dimethyl-formamide, somewhat soluble in water and methanol and soluble in 1 N-hydrochloric acid.

The L-prolyl-L-phenylalanyl-L-histidyl-L-leucine methyl ester (X) is prepared as described below.

*Example 6.—L - asparaginyl - L - arginyl - L - valyl - L-tyrosyl - L - valyl - L - histidyl - L - propyl - L - phenyl-alanyl-L-histidyl-L-leucine methyl ester (XII)*

60 milligrams of Compound XI (0.041 mmol) are dissolved in 2 cc. of 0.1 N-solution of hydrogen chloride in methanol, and the solution is agitated in the presence of 50 milligrams of palladium charcoal (10 percent of palladium) at room temperature and normal pressure for 15 hours in an atmosphere of hydrogen. The catalyst is then removed by filtration, washed with a small amount of methanol and evaporated to dryness. Small quantities of methanol are added several times to the residue and the mixture is evaporated to dryness. After being dried in a high vacuum, the residue (resin) weighs 67 milligrams (calculated for the tetrahydrochloride of Compound XII equals 61 milligrams).

The product is easily soluble in methanol and water. An aqueous solution of the product yields with silver nitrate a precipitate of silver chloride. No precipitate is formed when a 2 N-solution of sodium carbonate is added.

*Example 7.—L - asparaginyl - L - arginyl - L - valyl - L-tyrosyl - L - valyl - L - histidyl - L - prolyl - L - phenyl-alanyl-L-histidyl-L-leucine (XIII)*

52 milligrams (about 0.035 mmol) of the crude amorphous tetrahydrochloride of Compound XII obtained as described in Example 6 are dissolved in 0.25 cc. of water, and 0.25 cc. of 1 N-caustic soda solution (corresponding to 7 equivalents) is added. The turbid solution is allowed to stand at room temperature for 1½ hours (the final pH of the solution is 10.5) and then 0.25 cc. of 1 N-hydrochloric acid is added (pH value of the solution about 3.5). A flocculent precipitate is formed. The precipitate is separated by centrifuging, and the sediment is washed twice with 0.5 cc. of water (centrifuging). The precipitated material, after being dried, weighs 4 milligrams. The aqueous solution and the washing water are combined, and the mixture is given a pH value of 6.5 by the dropwise addition of 0.1 N-caustic soda solution (final volume equals 3.8 cc.).

A test portion of the solution is diluted with 100 times its quantity of a physiological sodium chloride solution, and 0.1 cc. of the solution, when injected into rats, causes a strong increase in blood pressure, which persists for about twice the period of an increase in blood pressure caused by hypertensin.

The main quantity of the solution is frozen in an ice-sodium chloride bath and lyophilized under 0.1 mm. pressure of mercury. The decapeptide obtained as residue (31 milligrams) is a colorless powder which is easily soluble in water, but unlike hypertensin, is rather sparingly soluble in methanol. The β-carboxylic acid amide group of the asparaginyl residue can be hydrolysed to form the carboxyl group, for example, with hydrochloric acid.

*Example 8.—N - carbobenzyloxy - L - valyl - L - tyrosyl-L - valyl - L - histidyl - L - prolyl - L - phenylalanyl-L-histidyl-L-leucine methyl ester*

1.95 grams (0.003 mol) of carbobenzyloxy-L-valyl-L-tyrosyl-L-valyl-L-histidine are dissolved in 10 cc. of dimethylformamide, and 1.58 grams (0.003 mol) of L-prolyl-L-phenylalanyl-L-histidyl-L-leucine methyl ester and 0.84 gram (0.0035 mol) of 1-cyclohexyl-3-morpholinyl-ethyl-carbodiimide are added. After 30 minutes the starting material is completely dissolved. The reaction mixture is allowed to stand overnight at room temperature, is then freed from dimethyl-formamide under 0.1 mm. pressure of mercury, and the residue is mixed with ice water. The precipitated solid material is triturated with 2 N-hydrochloric acid, whereby the initially oily hydrochloride of the basic reaction product is formed, which again becomes solid upon further trituration. After washing it twice with 2 N-hydrochloric acid, the product is converted into the basic form by treatment with dilute sodium carbonate solution, washed several times with water and dried in vacuo at room temperature. The crude carbobenzyloxy-L-valyl-L-tyrosyl-L-valyl-L-histidyl-L-prolyl-L-phenylalanyl-L-histidyl-L-leucine methyl ester is dissolved in 20 cc. of ethanol, and the solution is freed from a small amount of undissolved material and evaporated in vacuo. By triturating the residue with ethyl acetate there is obtained a granular product, which melts unsharply at 160° C. The yield amounts to 2.29 grams (66 percent).

The crude N-carbobenzyloxy-octapeptide-methyl ester-hydrochloride can be worked up in the following manner: It is dissolved in 30 cc. of water, centrifuged to remove a small amount of insoluble constituents, and precipitated by the addition of 7.5 cc. of concentrated hydrochloric acid at 0° C. (end concentration, about 2 N HCl). For conversion into the free octapeptide derivative the hydrochloride is dissolved in 30 cc. of water and at 0° C. mixed with 3 cc. of 10 N-potassium carbonate solution. The solid precipitate formed is filtered off, washed neutral with water and dried under reduced pressure at 35° C. On trituration with ethyl acetate an amorphous powder is formed which melts unsharply at 160° C. The yield is 2.29 g.

The crude carbobenzyloxy-L-valyl-L-tyrosyl-L-valyl-L-histidyl-L-prolyl-L-histidyl-L-leucine methyl ester is further purified by countercurrent distribution; in the system methanol (3), water (1)/chloroform (1), carbon tetrachloride (2) after 48 distribution steps about half of the substance treated is in the elements 25–43 (distribution coefficient $k=2.16$). Another distribution of this material in the system methanol (3), water (1)/chloroform (2), carbon tetrachloride (1) over 48 steps gives a weight distribution of the substance in the elements 5–14 with a distribution coefficient $k=0.23$ which is in good agreement with the theoretical curve.

The purified amorphous material (yield, 23%), after two reprecipitations from acetone melts at 170–173° C.; $[\alpha]_D^{24} = -73° C. \pm 4°$ (c.=1.01 in ethanol).

*Analysis.*—$C_{60}H_{78}O_{12}N_{12}$ (1159.38) (dried for 5 hours at 80° C.). Calculated: C 62.16; H 6.78; N 14.50 OCH$_3$; 2.67%. Found: C 60.45; H 6.83; N 14.24 OCH$_3$; 2.60%.

*Example 9.—L-valyl-L-tyrosyl-L-valyl-L-histidyl-L-prolyl-L-phenylalanyl-L-histidyl-L-leucine methyl ester*

(a) A solution of 579 milligrams (0.005 mol) of carbobenzyloxy - L-valyl-L-tyrosyl-L-valyl-L-histidyl-L-prolyl-L-phenylalanyl-L-histidyl-L-leucine methyl ester is mixed with 1 cc. of a 1 N-solution of hydrogen chloride in methanol and hydrogenated in the presence of 0.2 gram of palladium-charcoal (10 percent of palladium) at 20° C. under normal pressure (the $CO_2$ formed is absorbed in caustic soda solution), and in the course of 90 minutes a little more than the calculated quantity of hydrogen is absorbed. The catalyst is then filtered off and the filtrate is evaporated. The resulting dihydrochloride of the reaction product (0.51 gram) is washed with acetone, then dissolved in a small amount of water, and the solution is rendered alkaline with an excess of sodium carbonate solution. The L-valyl-L-tyrosyl-L-valyl-L-histidyl-L-prolyl-L-phenylalanyl-L-histidyl-L-leucine methyl ester which precipitates as a solid material is washed with water and dried in vacuo at 40° C. The yield amounts to 213 milligrams (41 percent). The product is soluble in ethanol, chloroform and in a large quantity of acetone, and difficultly soluble in ethyl acetate and acetonitrile.

(b) A better yield is obtained by following this procedure: A solution of 347 mg. (0.3 mmol) of carbobenzyloxy - L - valyl-L-tyrosyl-L-valyl-L-histidyl-L-prolyl-L-phenylalanyl-L-histidyl-L-leucine-methyl ester in 10 cc. of absolute methanol is hydrogenated in the presence of 0.2 g. of palladium charcoal (10% Pd) at 20° C. under atmospheric pressure (the $CO_2$ formed being absorbed in caustic soda solution). In the course of 90 minutes a little more than the calculated quantity of hydrogen is taken up. The reaction solution is filtered and evaporated under reduced pressure and the solid residue reprecipitated from a mixture of methanol and ether. The resulting octapeptide methyl ester (276 mg., 90%) is soluble in ethanol, sparingly soluble in acetone, chloroform, acetonitrile, and insoluble in water. It can be used for further reactions as it is.

(c) The trihydrobromide can be prepared as follows: 128 mg. (0.11 mmol) of carbobenzyloxy-L-valyl-L-tryosyl - L-valyl-L-histidyl-L-prolyl-L-phenylalanyl-L-histidyl-L-leucine methyl ester are triturated with 0.1 cc. of glacial acetic acid to form a homogeneous oil, and mixed with 0.35 cc. of a 1.6 N-solution (0.55 mmol) of hydrogen bromide in glacial acetic acid. After 10 minutes, the reaction product begins to precipitate from the clear solution in the form of a dark oil. The mixture is mechanically shaken for 2½ hours and then evaporated completely at 35° C. under a pressure of 0.1 mm. of mercury. On being triturated with ether, the oily residue becomes solid and when washed with hot acetone gives 118 mg. (85%) of octopeptide-methyl ester-trihydrobromide in the form of a faintly brownish powder which melts unsharply at 210° C. with decomposition. It is easily soluble in water, methanol and ethanol.

*Analysis.*—$C_{52}H_{72}O_{10}H_{12}$, 3 Hbr (1268.02). Calculated: Br. 18.91%. Found: 18.57%.

The free octapeptide-methyl ester can be obtained from the trihydrobromide only in poor yield (41%). It is therefore of advantage to prepare it by the process described under (b) above.

*Example 10.—N - carbobenzyloxy-L-asparaginyl-L-nitroarginyl - L-valyl-L-tyrosyl-L-valyl-L-histidyl-L-prolyl-L-phenylalanyl-L-histidyl-L-leucine methyl ester*

(a) 70 milligrams ($1.5 \times 10^{-4}$ mol) of carbobenzyloxy-L-asparaginyl-L-nitroargenine and 154 milligrams of L-valyl - L-tyrosyl-L-valyl-L-histidyl-L-prolyl-L-phenylalanyl-L-histidyl-L-leucine methyl ester ($1.5 \times 10^{-4}$ mol) are dissolved in 0.3 cc. of dimethylformamide, 48 milligrams ($2 \times 10^{-4}$ mol) of 1-cyclohexyl-3-morpholinyl-ethyl-carbodiimide are added, and the whole is allowed to stand at room temperature for 20 hours. The solvent is then removed under 0.1 mm. pressure of mercury, the residue is triturated with ice water, filtered off, and washed several times with water. The crude product is suspended in 1 cc. of water, converted into its soluble hydrochloride by slight acidification with hydrochloric acid, the solution is filtered through Norit, and the filtrate is rendered alkaline with saturated sodium carbonate solution. The precipitated solid material is washed with water, dried, triturated with acetone and washed several times with the same solvent. The resulting carbobenzoxy-L-asparaginyl-L - nitroarginyl - L-valyl-L-tyrosyl-L-valyl-L-histidyl-L-prolyl - L-phenylalanyl-L-histidyl-L-leucine-methyl ester melts unsharply at 180° C. and is identical with the decapeptide derivative described in Example 5.

(b) 234 mg. (0.5 mmol) of carbobenzyloxy-L-asparaginyl-nitro-L-arginine and 185 mg. (0.18 mmol) of L-valyl - L - tyrosyl-L-valyl-L-histidyl-L-prolyl-L-phenylalanyl-L-histidyl-L-leucine-methyl ester are dissolved in 1.5 cc. of dimethyl formamide, then mixed with 119 mg. (0.5 mmol) of 1-cyclohexyl-3-morpholinylethyl-carbodiimide and allowed to stand at room temperature for 20 hours. The solvent is distilled off at 0.1 mm. pressure of mercury, the residue triturated with ice water, the solid material filtered off, washed several times with water, and dried in vacuo at 35° C. The crude product is triturated several times with acetone and 184 mg. of the decapeptide derivative obtained in the form of a yellowish powder.

Countercurrent distribution shows the resulting product to be far from homogeneous.

Successive distributions in the systems—

(a) $CH_3OH(3)$, $H_2O(1)/CHCl_3(2)$, $CCl_4(1)$
(b) $CH_3OH(3)$, $H_2O(1)/CHCl_3(2)$, $CCl_4(2)$
(c) $CH_3OH(3)$, $H_2O(1)/CHCl_3(4)$, $CCl_4(1)$ eliminate the by-products to a great extent, and another distribution of the main product (about ⅓ of the substance subjected to the treatment) in the system (a) over 36 steps gives a weight distribution in the elements 14–30 almost in agreement with the theoretical curve with a distribution coefficient $k=1.55$.

After reprecipitation from the little ethanol the amorphous substance melts unsharply at 181–184° C. (decomposition at 187° C.); $[\alpha]_D^{24}=-55°\pm4°$ (c.=0.65 in 0.01 N-HCl in methanol).

*Analysis.*—$C_{70}H_{95}O_{17}H_{19}$ (1474.68) (dried for 5 hours at 80° C.). Calculated: C 57.01; H 6.49; N 18.05. Found: C 56.14; H 6.49; N 17.64.

*Example 11.—N-carbobenzyloxy-L-valyl-L-tyrosine ethyl ester*

(a) *By means of carbodiimide.*—A solution of 50.2 grams (0.2 mol) of carbobenzyloxy-L-valine and 41.8 grams (0.2 mol) of L-tyrosine ethyl ester in 400 cc. of acetonitrile is mixed with 45.3 grams (0.22 mol) of 1:3-di-cyclohexyl-carbodiimide, and the mixture is allowed to stand at room temperature for 5 hours. The precipitated mixture of di-cyclohexyl-urea and the reaction product is filtered off, and the dipeptide derivative is extracted from the mixture with ethyl acetate. The original reaction solution is evaporated in vacuo, the residue is dissolved in ethyl acetate, and the resulting solution is washed with 2 N-hydrochloric acid, a 2 N-solution of sodium hydrogen carbonate and water, dried, and mixed with the aforesaid ethyl acetate solution of the reaction product originally separated. The residue obtained by evaporation in vacuo crystallizes upon the addition of ether, and yields 74.5 grams (84 percent) of carbobenzyloxy-L-valyl-L-tyrosine ethyl ester melting at 142–145° C. By recrystallizataion from a mixture of acetone and ether there are obtained 68.6 grams of pure material melting at 148–149° C., and having the specific rotation $[\alpha]_D^{24}=+33°\pm1°$ (c.=3.96 in chloroform).

(b) *By way of the para-nitrophenyl ester.*—20 grams (0.08 mol) of carbobenzyloxy-L-valine are dissolved in 25 cc. of dry pyridine, and mixed with 26.6 grams (0.082 mol) of di-para-nitrophenyl sulfite. The solution is allowed to stand overnight at 30° C. and is then freed from solvent in vacuo. To the residue there are added about 50 grams of ice, and the mixture is acidified with 2 N-hydrochloric acid (pH value 1). After 10 minutes the mixture is extracted with ether and the ethereal solution is washed with 2 N-hydrochloric acid, ice-water, ice-cold dilute caustic soda solution and ice-water again, dried and evaporated. The oily residue (25 grams), after crystallization from a mixture of ether and petroleum ether, yields 22.7 grams (=76 percent) of carbobenzyloxy-L-valine para-nitrophenyl ester melting at 63–64° C.

1.12 grams (0.003 mol) of the latter ester and 0.63 gram (0.003 mol) of L-tyrosine ethyl ester are dissolved in 3 cc. of tetrahydrofurane, and the solution is allowed to stand for 48 hours at room temperature. After removing the solvent in vacuo, the reaction product is taken up in ethyl acetate, and the ethyl acetate solution is washed with 2 N-hydrochloric acid, saturated sodium hydrogen carbonate solution and water, dried and evaporated in vacuo. Upon the addition of ether 0.90 gram (67 percent) of solid carbobenzyloxy-L-valyl-L-tyrosine ethyl ester separate out, and, after recrystallization from a mixture of acetone and ether, this product melts at 145–147° C. and has the specific rotation $[\alpha]_D^{23}=+34°\pm1°$ (c.=4.03 in chloroform).

*Example 12.—N-carbobenzyloxy-L-valyl-o-benzoyl-L-tyrosine-ethyl ester*

372 milligrams (0.001 mol) of the carbobenzyloxy-L-valine-para-nitrophenyl ester described in section (b) of Example 12 are dissolved in 1 cc. of ethyl acetate, and 1 cc. of a solution containing 0.0013 mol of o-benzoyl-L-tyrosine ethyl ester (freshly prepared from its hydrochloride) in ethyl acetate is added. Upon allowing the solution to stand at room temperature the reaction product begins to separate as a solid material. After 22 hours the mixture is filtered to yield 466 milligrams of filter residue, and the filtrate is washed with 2 N-hydrochloric acid, a 2 N-solution of sodium hydrogen carbonate and water, and is then evaporated. The filtrate yields, on the addition of ether, a further 56 milligrams of product, the total being 522 milligrams (95 percent). After recrystallization twice from a mixture of acetone and ether the resulting N-carbobenzyloxy-L-valyl-o-benzoyl-L-tyrosine ethyl ester melts at 173–170° C. and has the specific rotation $[\alpha]_D^{23}=+24°\pm2°$ (c.=1.51 in chloroform).

*Example 13.—N-carbobenzyloxy-L-valyl-L-tyrosine*

(a) *From N - carbobenzyloxy-L-valyl-L-tyrosine ethyl ester.*—70.7 grams (0.16 mol) of carbobenzyloxy-L-valyl-L-tyrosine ethyl ester are dissolved in 300 cc. of methanol and 400 cc. of 1 N-caustic soda solution are added in the course of 15 minutes at about 10° C., while stirring. The clear reaction solution is allowed to stand for 2 hours at room temperature, and is then free from methanol in vacuo and a small amount of solid material is filtered off. Upon acidifying the filtrate with dilute hydrochloric acid the carbobenzyloxy-L-valyl-L-tyrosine separates out in crystalline form, and the latter is filtered off, washed with water, and dried in vacuo at 50° C. It melts at 161–163° C. and has the specific rotation $[\alpha]_D^{22}=+26°\pm1°$ (c.=4.01 in pyridine). The yield amounts to 64.01 grams (97%).

(b) *From N-carbobenzyloxy-L-valyl-o-benzoyl-L-tyrosine ethyl ester.*—546 milligrams (0.001 mol) of carbobenzyloxy-L-valyl-o-benzoyl-L-tyrosine ethyl ester are dissolved in 20 cc. of hot methanol, and the solution is cooled rapidly and 4 cc. of 1 N-caustic soda solution are added immediately. After 2 hours the product is worked up as described above, whereby 380 milligrams (97 percent) of crystalline material melting at 161–163° C. are obtained, which is identical with the carbobenzyloxy-L-valyl-L-tyrosine described in paragraph (a) above.

*Example 14*

(a) *N - carbobenzyloxy - L - valyl - L - histidine methyl ester.*—A solution of 25.1 grams (0.1 mol) of carbobenzyloxy-L-valine and 16.7 grams (0.1 mol) of L-histidine methyl ester in 100 cc. of acetonitrile is mixed at 10° C with 26.1 grams of 1-cyclohexyl-3-morpholinylethyl-carbodiimide (0.11 mol) and allowed to stand at room temperature. After about one hour a gelatine-like product begins to separate out, and after 15 hours the latter is filtered off and washed with acetonitrile. There are obtained 30.8 grams (77 percent) of this compound melting at 152–156° C. After being recrystallized from a mixture of acetone and ether carbobenzyloxy-L-valyl-L-histidine methyl ester melts at 161–163° C. and has the specific rotation $[\alpha]_D^{23} = -22° \pm 2°$ (c.=2.04 in ethanol).

(b) *L-valyl-L-histidine methyl ester.*—10 grams (0.025 mol) of carbobenzyloxy-L-valyl-L-histidine methyl ester are dissolved in 100 cc. of methanol, a solution of 0.03 mol of hydrogen chloride gas in methanol is added and hydrogenation is carried out in the presence of 2 grams of palladium-charcoal (10 percent of palladium) at room temperature and normal pressure, the $CO_2$ formed being simultaneously absorbed in caustic soda solution. When the calculated quantity of hydrogen has been absorbed the hydrogenation ceases after one hour. The catalyst is filtered off and the reaction solution is evaporated in vacuo. The hydrochloride of the base obtained in the form of an oil (8.7 grams) is dissolved in a small amount of water, and, after covering the solution with a layer of ethyl acetate, the solution is rendered strongly alkaline by agitating it at 0° C. with a saturated solution of potassium carbonate. The ethyl acetate phase containing the reaction product is dried and evaporated in vacuo and the L-valyl-L-histidine methyl ester (6.5 grams) obtained as an oily residue is used for further reaction without further treatment.

*Example 15—N-carbobenzyloxy - L - valyl - L - tyrosyl-L-valine-methyl ester.*

(a) *By means of carbodiimide.*—A solution of 53.8 grams (0.13 mol) of N-carbobenzyloxy-L-valyl-L-tyrosine and 17.0 grams (0.13 mol) of L-valine methyl ester (freshly prepared from its hydrochloride) is mixed while cooling, with 30 grams (0.15 mol) of N:N′-dicyclohexylcarbodiimide, and the whole is allowed to stand for 4 hours at room temperature. The precipitated solid material consisting of a mixture of the tripeptide derivative and di-cyclohexylurea is filtered off, extracted with tetrahydrofurane, the undissolved urea compound is filtered off, and the filtrate is evaporated in vacuo and the residue is mixed with ether, whereby 42.1 grams of a gelatine-like material melting at 177–179° C. are obtained. The original reaction solution is likewise evaporated in vacuo, and the residue is taken up in a large quantity of ethyl acetate, and the ethyl acetate solution is washed with 2 N-hydrochloric acid, 2 N-solution of sodium hydrogen carbonate and water, dried and evaporated. After the addition of ether to the residue, a further 13.3 grams of material are isolated melting at 170–172° C. The total yield amounts to 55.4 grams (81 percent). Recrystallization from a mixture of acetone and ether yields 51.4 grams (75 percent) of N-carbobenzyloxy-L-valyl-L-tyrosyl-L-valine methyl ester melting at 194–196° C. and having the specific rotation $[\alpha]_D = -24° \pm 1°$ (c.=4.08 in glacial acetic acid).

(b) *By means of activated ester.*—0.3 gram (0.002 mol) of N-carbobenzyloxy-L-valyl-L-tyrosine is dissolved in a mixture of 5 cc. of ethyl acetate and 0.32 cc. (0.004 mol) of pyridine, then mixed with 0.69 gram (0.002 mol) of di-para-nitrophenyl sulfite, and the whole is heated for 2 hours at 50° C. Upon cooling a portion (0.14 gram) of the reaction product separates out, and the main quantity (0.50 gram) is obtained by washing the reaction solution with dilute hydrochloric acid, a saturated solution of sodium hydrogen carbonate and water, drying the solution, evaporating it, and crystallizing the residue from ether. The product melts at 175–176° C., and the yield is 0.64 gram (60 percent). After recrystallization from a mixture of acetone and ether, the nitrophenyl ester melts at 176–170° C. and has the specific rotation $[\alpha]_D^{23} = -2° \pm 1°$ (c.=4.07 in acetone). It consists of a mixture of N-carbobenzyloxy-L-valyl-L-tyrosine ester and N-carbobenzyloxy-L-valyl-D-tyrosine ester.

A solution of 535 milligrams (0.001 mol) of the resulting carbobenzyloxy-dipeptide-para-nitrophenyl ester and 131 milligrams (0.001 mol) of L-valine methyl ester in 2 cc. of tetrahydrofurane is allowed to stand for 48 hours at room temperature and then freed from tetrahydrofurane in vacuo. Upon the addition of ethyl acetate 261 milligrams of the reaction product (melting at 172–174° C.) crystallize out, and, after working up the ethyl acetate solution as described under (a) above, a further 170 milligrams of the product is obtained by crystallization from ether (total of 431 milligrams= 82 percent). After recrystallization from a mixture of acetone and ether, the product melts at 173–175° C. and is a mixture of N-carbobenzyloxy-L-valyl-L-tyrosyl-L-valine methyl ester and N-carbobenzyloxy-L-valyl-L-tyrosyl-L-vaine-methyl ester. The optical rotation is but slightly lower than that of the product obtained as described under (a) above.

*Example 16.—N-carbobenzyloxy-L-valyl-L-tyrosyl-L-valine*

A solution of 47.5 grams (0.09 mol) of N-carbobenzyloxy-L-valyl-L-tyrosyl-L-valine methyl ester in 350 cc. of methanol is mixed at about 10° C., while stirring with 250 cc. of 1 N-caustic soda solution and the whole is allowed to stand for two hours at room temperature. The methanol is then distilled off in vacuo, and the aqueous slightly turbid solution is filtered, cooled to 0° C., and acidified with hydrochloric acid. The precipitated solid material is filtered off, washed with water, dissolved in the moist state in 1 liter of an 0.5 N-solution of sodium hydrogen carbonate, about 0.8 gram of insoluble material is filtered off, and reprecipitation is caused by adding an excess of hydrochloric acid, and the precipitate is washed with water. The dried product melts at 218–220° C. The yield amounts to 37.1 grams (=80 percent). By recrystallization from aqueous ethanol there are obtained 32.1 grams (=70 percent) of pure N-carbobenzyloxy-L-valyl-L-tyrosyl-L-valine melting at 222–224° C. and having the specific rotation $[\alpha]_D^{23} = -26° \pm 1°$ (c.=4.16 in ethanol).

*Example 17.—N-carbobenzyloxy-L-valyl-L-tyrosyl-L-valyl-L-histidine methyl ester*

(a) *From dipeptide derivatives by means of carbodiimide.*—A solution of 9.94 grams (0.024 mol) of carbobenzyloxy-L-valyl-L-tyrosine in 100 cc. of acetonitrile is mixed with 6.64 grams (0.28 mol) of 1-cyclohexyl-3-morpholinylethylcarboimide, and then 6.5 grams (0.024 mol) of L-valyl-L-histidine-methyl ester are added. After 15 hours the precipitated reaction product is filtered off and washed with acetonitrile. The crude product (11.2 grams=70 percent) melting at 208–211° C. is dissolved in 500 cc. of hot methanol, the solution is concentrated to 100 cc., and its own volume of ether is added. The precipitated pure carbobenzyloxy - L - valyl - L - tyrosyl-L-valyl-L-histidine methyl ester melts at 222–224° C. and has the specific rotation $[\alpha]_D^{24} = -27° \pm 2°$ (c.=2.00 in glacial acetic acid).

(b) *From dipeptide derivatives by way of activated ester.*—539 milligrams (0.001 mol) of the carbenzyloxydipeptide para-nitrophenyl ester described in paragraph (b) of Example 16 and 270 milligrams of L-valyl-L-histidine methyl ester are dissolved in 4 cc. of tetrahydrofurane. Upon allowing the solution to stand the reaction product begins to separate after 30 minutes, and it is filtered off after 24 hours. There are obtained 462 milligrams (=70 percent) of the product melting at 208–211° C. After recrystallization from a mixture of methanol and ether the tetrapeptide derivative has a somewhat lower melting point (219–221° C.) than the product described in (a) above, and also a somewhat lower optical rotation. The mixed melting point of the products obtained according to (a) and (b) shows no depression, even though according to (b) there is not obtained the pure carbobenzyloxy-L-valyl-L-tyrosyl-L-valyl-L-histidine methyl ester, but a mixture thereof with carbobenzyloxy - L - valyl - D - tyrosyl - L - valyl - histidine methyl ester.

(c) *From the tripeptide derivative by means of carbodiimide.*—A solution of 28.22 grams (0.055 mol) of N-carbobenzyloxy - L- valyl - L - tyrosyl - L - valine and 10.14 grams (0.06 mol) of L-histidine methyl ester in 300 cc. of tetrahydrofurane is mixed at about 10° C. with a solution of 14.22 grams (0.06 mol) of 1-cyclohexyl-3-morpholinyl ethyl-carbodiimide in 100 cc. of acetonitrile and the mixture is allowed to stand for 15 hours at room temperature, during which the reaction product separates out in solid form. The latter is filtered off (16.0 grams melting at 213–216° C.), and a further fraction is isolated from the mother liquor by concentrating (6.35 grams melting at 207–210° C.). The combined amounts of the product (22.35 grams=61 percent) are recrystallized from a mixture of methanol and ether as described under (a) above, and there are obtained 18.5 grams (=50 percent) of the tetrapeptide derivative melting at 225–228° C. and having the specific rotation $[\alpha]_D^{20} = -28° \pm 2°$ (c.=2.02 in glacial acetic acid).

*Example 18*

(a) *N - carbobenzyloxy - L - valyl - L - tyrosyl - L- valyl-L-histidine.*—A suspension of 3.32 grams (0.005 mol) of carbobenzyloxy-L-valyl-L-tyrosyl-L-valyl-L-histidine methyl ester in 30 cc. of methanol is mixed at about 10° C. with 5 cc. of a 1 N-solution caustic soda solution whereupon the starting material rapidly dissolves. The reaction solution is allowed to stand for 2 hours at room temperature, and is then freed from methanol in vacuo, and, after separating a few flocks by filtration, is acidified with 20 cc. of 2 N-acetic acid. The precipiated gelatinous material is separated by centrifuging, suspended several times in water, and is again contrifuged and finally washed with acetone and methanol and dried in vacuo at 40° C. The carbobenzyloxy-L-valyl-L-tyrosyl-L-valyl-L-histidine is obtained in a yield of 2.74 grams (84 percent) and melts at 236–238° C.

$$[\alpha]_D^{23} = -10° \pm 2°$$

(c.=2.10 in glacial acetic acid) It is insoluble in all the usual organic solvents except dimethyl-formamide and glacial acetic acid.

(b) *L-valyl-L-tyrosyl-L-valyl-histidine methyl ester.*— 3.32 grams (0.005 mol) of carbobenzyloxy-L-valyl-L-tyrosyl-L-valyl-L-histidine methyl ester are finely ground and suspended in 100 cc. of absolute methanol, and hydrogenated in the presence of 1.0 gram of palladium-charcoal (10 percent of palladium), the $CO_2$ formed being absorbed in caustic soda solution. When slightly more than the calculated quantity of hydrogen has been absorbed the hydrogenation ceases. The solution is filtered to remove the catalyst and is evaporated in vacuo, the residue is triturated with acetone and the solid material is filtered off. The resulting L-valyl-L-tyrosyl-L-valyl-L-histidine methyl ester (2.02 grams=76 percent) melts unsharply at 190° C. and is sufficiently pure for the further reactions.

*Example 19.—N-carbobenzyloxy-L-prolyl-L-phenylalanine*

(a) *N-carbobenzyloxy-L-prolyl-L-phenylalanyl methyl ester by way of the mixed anhydride.*—In order to dissolve 1 gram (0.004 mol) of crystalline N-carbobenzyloxy-L-proline in 15 cc. of absolute tetrahydrofurane 0.61 cc. (0.0044 mol) of triethylamine are added at −10° C., after 5 minutes at the same temperature 0.42 cc. (0.0044 mol) of chloroformic acid ethyl ester is added. The triethylamine hydrochloride precipitates immediately in the form of a white crystalline precipitate.

A simultaneously prepared solution of L-phenylalanine methyl ester, which has been freed from triethylamine hydrochloride by filtration and which ester is obtained from 1.1 grams (0.0051 mol) of phenylalanine methyl ester hydrochloride and 0.71 cc. (0.0055 mol) of triethylamine, is also cooled to −10° C. and is added to the solution of the mixed anhydride. After allowing the mixture to stand for 2 hours at room temperature, it is filtered to remove the precipitate, and the solvent is evaporated in vacuo at 40–45° C. The water clear residue is taken up in ethyl acetate, the solution is washed four times with 5 cc. of a 1 N-hydrogen chloride solution on each occasion, twice with water, four times with 2 cc. of a 2 N-solution of sodium hydrogen carbonate on each occasion, and finally washed neutral with water. The ethyl acetate solution, after being evaporated, and when the residue is dried, yields 1.8 grams of a yellowish oil which still contains a small amount of solvent. The crude carbobenzyloxy-L-prolyl-L-phenylalanine methyl ester is immediately hydrolyzed to form N-carbobenzyloxy-L-prolyl-L-phenylalanine.

(b) *Hydrolysis to N - carbobenzyloxy - L - proline-L-phenylalanine.*—1.8 grams (about 0.004 mol) of crude carbobenzyloxy-L-prolyl-L-phenylalanine methyl ester are allowed to stand in 5 cc. of methanol with 4.4 cc. of 1 N-caustic soda solution for 1½ hours at room temperature, the whole is then mixed with 25 cc. of water, and the aqueous alkaline solution is extracted twice with fresh ethyl acetate. Upon acidification with 1 N-hydrochloric acid until the reaction is acid to Congo, the carbobenyl-oxy-L-prolyl-L-phenylalanine separated out as a viscous colorless oil. The oil and the aqueous phase are extracted three times with fresh ethyl acetate in three separating funnels, and the ethyl acetate solutions are washed neutral with water, dried over sodium sulfate, and evaporated under reduced pressure. 1.4 grams of a colorless foam remains behind. The latter is dissolved in 2 cc. of acetone and 10 cc. of ether are added, and by adding petroleum either in portions at 0° C. 1.3 grams (82 percent) of crystalline carbobenzyloxy-L-proline-L-phenylalanine melting at 121–123° C. are obtained, having the specific rotation $[\alpha]_D^{23} = -49°$ (c.=1.215 in chloroform).

(c) *N-carbobenzyloxy-L-prolyl - L - phenylalanine by way of the active ester.*—(1) *N-carbobenzyloxy-L-proline-para-nitrophenyl ester.*—5 grams (0.02 mol) of N-carbobenzyloxy-L-proline and 6.5 grams (0.02 mol) of di-para-nitrophenyl sulfite are allowed to stand in 8 cc. of absolute pyridine for 23 hours at room temperature, the pyridine is removed by suction in vacuo and there are added to the evaporation residue ice and 2N-hydrochloric acid to give a pH value of 1. The precipitated oil solidifies after standing in an ice cabinet for one hour, to form an amorphous product. The latter is filtered off and washed with a large quantity of water and ether. The amorphous product, after being dried, weighs 2.9 grams.

The ethereal mother liquor is agitated in an ice chamber, while constantly cooling with ice, twice with 2N-hydrochloric acid solution, twice with water, then alternately four times with 1N-caustic soda solution and finally washed neutral with water. Evaporation of the dried solution gives 3.5 grams of yellowish crystals. The yield, after reprecipitating the two fractions once from a large quantity of ether, is 5.9 grams (80 percent) of N-carbobenzyloxy-L-proline para-nitrophenyl ester melting at 94–95° C.

(2) *N - carbobenzyloxy - L - prolyl - L - phenylalanine methyl ester.*—1 gram (0.0046 mol) of L-phenylalanine methyl ester hydrochloride is suspended in 20 cc. of ethyl acetate, 0.7 cc. (0.005 mol) of triethylamine is added, and the mixture is allowed to stand for 15 minutes at room temperature with frequent agitation. 1.72 grams (0.0046 mol) of carbobenzyloxy-L-proline para-nitrophenyl ester in 5 cc. of ethyl acetate are added, and the whole is allowed to react for 72 hours at 20° C. The reaction solution is treated three times with 2N-hydrochloric acid, twice with water, and four times with 2 N-caustic soda solution and water alternately, and is finally washed neutral. There are obtained 1.9 grams of crude carbobenzyloxy-dipeptide ester, which still contains a small amount of solvent. The product is directly used in the further treatment.

(3) *Hydrolysis.*—Hydrolysis with 1 N-caustic soda solution in methanol in the manner described under (b) yields 1 gram (63 percent) of crystalline N-carbobenzyloxy-L-prolyl-L-phenylalanine melting at 121–124° C. and having the specific rotation $[\alpha]_D = -31°$ in chloroform.

*Example 20.—N-carbobenzyloxy-L-prolyl-L-phenylalanine-para-nitrophenyl ester.*

10 grams (0.025 mol) of N-carbobenzyloxy-L-prolyl L-phenylalanine are dissolved with the aid of heat in 16 cc. of absolute pyridine. The solution is allowed to cool to room temperature and 8.14 grams (0.025 mol) of di-para-nitrophenyl sulfite are added. After allowing the mixture to stand the whole contents of the flask solidify. There are also added 10 cc. of pyridine and the reaction mixture is allowed to stand for a total of 5 hours. The pyridine is sucked off for the greater part in vacuo and the crystalline residue is mixed with a large amount of ether. The crystals (9 grams melting at 146–147° C.) are filtered off with suction, and washed with a large amount of ether. The concentrated mother liquor is washed with dilute hydrochloric acid, sodium bicarbonate solution and water. After evaporating the dried ethereal solution, 1.7 grams of crystalline N-carbobenzyloxy-L-prolyl-L-phenylalanine para-nitrophenyl ester remain behind, and this product melts at 155° C. after recrystallization three times from ethyl acetate. The total yield amounts to 10.2 grams (79 percent).

*Example 21*

(a) *N-carbobenzyloxy-L-prolyl-L-phenylalanyl-L-histidine methyl ester.*—3 grams (0.0124 mol) of L-histidine methyl ester dihydrochloride are reacted with two equivalents of sodium methylate in methanol to give 2.5 grams of crude L-histidine methyl ester. The latter is dissolved in 5 cc. of absolute tetrahydrofurane and allowed to stand for 64 hours at room temperature in a solution of 4 grams (0.078 mol) of N-carbobenzyloxy-L-prolyl-L-phenylalanine para-nitrophenyl ester in 25 of cc. of absolute tetrahydrofurane. After 40 minutes the precipitation of N-carbobenzyloxy-L-prolyl-L-phenylalanyl - L - histidine methyl ester sets in. There are obtained in this manner 2.5 grams of the crystalline carbobenzyloxy-tripeptide ester. The mother liquor is evaporated to dryness in vacuo, the oily evaporation residue is taken up in ether and extracted by agitation 6 times with 3 cc. of 5 N-hydrochloric acid on each occasion. The hydrochloric acid solution is given a pH value of 8–9 by adding solid potassium carbonate, and the oil which separates is extracted three times with fresh ethyl acetate. The ethyl acetate solution is washed neutral, dried over sodium sulfate, and evaporated to yield 1.55 grams of oily carbobenzyloxy-tripeptide methyl ester, which is sufficiently pure for further treatment. The total yield is 4.05 grams (=92 percent).

(b) *N-carbobenzyloxy - L - prolyl-L-phenylalanyl-L-histidine.*—1.6 grams (0.0029 mol.) of crude carbobenzyloxy-L-prolyl-L-phenylalanyl-L-histidine methyl ester are hydrolyzed in 5 cc. of methanol with 2.9 cc. of 1 N-caustic soda solution for one hour at 20° C. The methanol is then partially evaporated under reduced pressure at room temperature and 5 cc. of water are added to the residue. In order to remove unsaponified material the aqueous solution is washed twice with ethyl acetate, and the ethyl acetate phases are washed twice with 3 cc. of water. By acidifying the united water washings with 2.9 cc. of 1 N-hydrochloric acid, carbobenzyloxy - L-prolyl-L-phenylalanyl-L-histidine separates out as a yellowish oil. The latter is insoluble in ethyl acetate and is therefore extracted three times with fresh chloroform. The chloroform solution is washed neutral and dried, and then evaporated to a small volume and the carbobenzyloxy-tripeptide is precipitated with a large quantity of ethyl acetate. The yield amounts to 1.2 grams (78 percent). By precipitating twice from a mixture of chloroform and ethyl acetate, there is obtained a product melting at 128–135° C. which is very hygroscopic and is immediately further treated.

*Example 22.—N-carbobenzyloxy-L-prolyl-L-phenylalanyl-L-histidyl-L-leucine methyl ester*

(a) *From dipeptide derivatives by means of carbodiamide.*—(1) *L-histidyl-L-leucine methyl ester.*—2 grams (0.0048 mol.) of carbobenzyloxy-L-histidyl-L-leucine methyl ester [prepared as described by R. W. Holley and E. Sondheimer, Journal American Chemical Society, vol. 76, page 1326 (1954)] are hydrogenated in 30 cc. of absolute methanol and 2 equivalents of hydrochloric acid in the presence of 600 milligrams of 10 percent of palladium on charcoal until the hydrogenation ceases. After 70 minutes 121 cc. of hydrogen have been taken up (by theory 120 cc.). The solution is freed from catalyst and evaporated to dryness in vacuo at 40° C. The residue is dissolved in 2 cc. of water, covered with 2 cc. of ethyl acetate, and 5 cc. of ice-cold solution of potassium carbonate of 50 percent strength are added at 0° C. The solution is dried with magnesium sulfate and evaporated to yield 1.1 grams (82 percent) of L-histidyl-L-leucine methyl ester in the form of an oil.

(2) *Reaction of N-carbobenzyloxy-L-prolyl-L-phenylalanine with L-histidyl-L-leucine methyl ester.*—A solution of 1.1 grams (0.0039 mol.) of freshly prepared L-histidyl-L-leucine methyl ester in 5 cc. of absolute acetonitrile is mixed with a solution of 1.54 grams (0.0039 mol.) of N-carbobenzyloxy-L-prolyl-L-phenylalanine in 10 cc. of absolute acetonitrile, and mixed with 890 milligrams (0.0044 mol.) of dicyclohexyl-carbodiimide. After allowing the mixture to stand at room temperature for 5 hours, 0.2 cc. of glacial acetic acid are added to the reaction solution and after 5 minutes it is filtered to remove precipitated urea. The acetonitrile is evaporated at 40° C. in vacuo and the residue is dissolved in ethyl acetate. The ethyl acetate solutions are extracted four times with 3 cc. of 1 N-hydrochloric acid each time and then 6 times with 5 cc. of 5 N-hydrochloric acid each time. The 5 N-hydrochloric acid extracts are rendered alkaline with solid dry potassium carbonate at 0° C., then extracted with ethyl acetate, and the ethyl acetate solution is dried over sodium sulfate, and evaporated to yield 1.6 grams (63 percent) of amorphous carbobenzyloxy-L-prolyl-L-phenylalanyl-L-histidyl-L-leucine methyl ester having the specific rotation $[\alpha]_D^{24} = -60° \pm 4°$ (c.=1.04 in methanol).

(b) *From dipeptide derivatives by way of the activated ester.*—A solution of 2.06 grams (0.004 mol.) of carbobenzyloxy-L-prolyl-L-phenylalanine para-nitrophenyl ester in 15 cc. of absolute tetrahydrofurane is added to 1.21 grams (0.0043 mol.) of L-histidyl-L-leucine methyl ester (prepared from 2.16 grams of carbobenzyloxy-L-histidyl-L-leucine methyl ester) in 5 cc. of absolute tetrahydrofurane. The whole is reacted for 42 hours at 20° C. The tetrahydrofurane is evaporated in vacuo. The residue is extracted in ethyl acetate three times with 5 cc. of 1 N-hydrochloric acid each time and 8 times with 3 cc. of 5 N-hydrochloric acid each time. By rendering the 5 N-hydrochloric acid extracts alkaline with solid potassium carbonate at 0° C. and extracting the precipitated oil with ethyl acetate, there are obtained, after precipitation once from a mixture of ethyl acetate and petroleum ether, 1.65 grams (62 percent) of amorphous N-carbobenzyl-oxy-L-prolyl-L-phenylalanyl-L-histidyl-L - leucine methyl ester having the specific rotation $[\alpha]_D^{23}=-53°\pm4°$ (c.=1.07 in methanol).

(c) *From the tripeptide derivative by means of carbodiamide.*—The combined solutions of 2 grams (0.0037 mol.) of N-carbobenzyloxy-L-prolyl-L-phenylalanyl-L-histidine in 15 cc. of absolute methylene chloride and 650 milligrams (0.0045 mol.) of L-leucine methyl ester in 4 cc. of absolute methylene chloride are mixed with 860 milligrams (0.0041 mol.) of dihydrohexyl-carbodiimide, and the mixture is allowed to react for 5 hours at room temperature. The method of working up is as described under (a) and there are obtained 1.7 grams (66 percent) of amorphous N-carbobenzyloxy-L-prolyl-L-phenylalanyl-L-histidyl-L-leucine methyl ester having the specific rotation $[\alpha]_D^{24}=-53°\pm4°$ (c.=0.830 in methanol).

*Example 23.—L-prolyl-L-phenylalanyl-L-histidyl-L-leucine methyl ester*

(a) *By hydrogenating cleavage.*—1.98 grams (0.003 mol.) of carbobenzyloxy-L-prolyl-L-phenylalanyl-L-histidyl-L-leucine methyl ester are dissolved in 30 cc. of methanol, then mixed with a solution of 0.006 mol. of hydrogen chloride gas in methanol, and hydrogenated in the presence of 0.5 gram of palladium charcoal (10 percent of palladium) at room temperature under normal pressure (with the use of a second hydrogenation vessel filled with dilute caustic soda solution to absorb the carbon dioxide formed). After the absorption of more than the calculated quantity of hydrogen in the course of 3 hours, the neutral reaction mixture is filtered to remove catalyst and evaporated in vacuo. The dihydrochloride of the base obtained in the form of a solid mass (1.88 grams) is dissolved in 5 cc. of water, a small amount of undissolved material is extracted with ethyl acetate, and the clear aqueous solution is rendered alkaline at 0° C. by means of an excess of a saturated solution of sodium carbonate. The precipitated oil is taken up in ethyl acetate, the ethyl acetate solution is washed with water, dried and evaporated. The L-prolyl-L-phenylalanyl-L-histidyl-L-leucine methyl ester (1.13 grams=74 percent) so obtained is sufficiently pure for further reactions.

(b) *By cleavage with hydrogen bromide in glacial acetic acid.*—1.98 g. (0.003 mol) of carbobenzyloxy-L-prolyl-L-phenylalanyl-L-histidyl-L-leucine-methyl ester are finely triturated with 1.5 cc. of glacial acetic acid and mixed with 6.3 cc. of a 1.6 N solution (0.01 mol) of hydrogen bromide in glacial acetic acid. After 30 minutes the starting material is dissolved completely. The reaction solution is allowed to stand at room temperature until the evolution of carbonic acid ceases (5 hours) and then evaporated completely in vacuo. The oily residue becomes solid when triturated with ether and on being washed with ethyl acetate and ether gives 2.07 g. (calculated 2.06 g.) of dihydrobromide of tetrapeptide-methyl ester in the form of a hydroscopic powder. The free ester is obtained in the manner described under (a) above. The yield is 1.43 g. (90%). The product is an oil which dissolves sparingly in water, and is readily soluble in 2 N HCl, acetone and chloroform.

*Example 24.—N-carbobenzyloxy-L-asparaginyl-nitro-L-arginyl-L-valyl-L-tyrosine methyl ester*

3.72 grams (13 millimols) of freshly prepared L-valyl-L-tyrosine methyl ester and 5.47 grams (11.8 millimols) of carbobenzyloxy-L-asparaginyl-nitro-L-arginine (VI) are dissolved in 35 cc. of dimethyl-formamide, and 2.52 grams (12.3 millimols) of 1:3-dicyclohexylcarbodiimide are added. After 24 hours at 21° C., the precipitated dicyclohexylurea is filtered off with suction, and the filtrate is completely freed from dimethyl-formamide under 0.1 mm. pressure of mercury and at a bath temperature of 45° C. The oil which remains behind is first washed with petroleum ether, and then, while cooling with ice, washed with dilute bicarbonate solution, water, dilute hydrochloric acid, and water, whereby the initially oily product slowly becomes granular. The crude product (8.79 grams) is reprecipitated from hot methanol for further purification, and the powder insoluble in methanol is triturated with hot acetone. In this manner 2.91 grams (33%) of carbobenzyloxy - L - asparaginyl - nitro-L-arginyl-L-valyl-L-tyrosine methyl ester are obtained melting at 202–206° C, and having the specific rotation of $[\alpha]_D^{23}=-4°\pm4°$ (c.=0.94 in dimethyl-formamide).

The L-valyl-L-tyrosine methyl ester used as starting material is prepared in the manner described below in Example 31.

*Example 25.—N-carbobenzyloxy-L-asparaginyl-nitro-L-arginyl-L-valyl-L-tyrosine*

2.58 grams (2.5 millimols) of N-carbobenzyloxy-L-asparaginyl-nitro-L-arginyl-L-valyl-L-tyrosine methyl ester are dissolved in 30 cc. of dimethyl-formamide, and a total of 100 cc. of ¹⁄₁₀ N-caustic soda solution is added in several portions in the course of 15 minutes, care being taken that the pH value of the solution does not exceed 11. After the addition of the caustic soda solution, the mixture is allowed to stand for a further 15 minutes at a pH value of 11, it is then adjusted to a pH value of 8 by the addition of solid carbon dioxide, and the solution is freed first at 11 mm. pressure and a bath temperature of 45° C. from water, and then at 0.1 mm. from dimethyl-formamide. The residue is dissolved in 30 cc. of water, the solution is filtered to remove a trace of flocks, and the clear filtrate is acidified with 2 N-hydrochloric acid while cooling. The precipitated viscous product is triturated, while cooling with ice, and thereby becomes solid. The crude product (2.14 grams) is dissolved in hot methanol and precipitated by the addition of acetonitrile. There are obtained 1.77 grams (70%) of N-carbobenzyloxy-L-asparaginyl-nitro-L-arginyl-L-valyl-L-tyrosine in the form of a powder melting at about 175 to 183° C. (frothing), and having the specific rotation $[\alpha]_D^{23}=0°\pm4°$ (c=0.4 in methanol).

*Example 26.—N-carbobenzyloxy-L-asparaginyl - nitro-L-arginyl - L - valyl - L - tyrosyl-L-isoleucyl-L-histidyl-L-prolyl-L-phenylalanine methyl ester*

1.88 grams (2.58 millimols) of carbobenzyloxy-L-asparaginyl-nitro - L - arginyl-L-valyl-L-tyrosine and 1.31 grams (2.50 millimols) of freshly prepared L-isoleucyl-L-histidyl-L-prolyl-L-phenylalanine methyl ester are dissolved in 15 cc. of dimethyl-formamide and a solution of 0.62 gram (2.62 millimols) of 1-cyclohexyl-3-morpholinylethylcarbodiimide is added. The solution is maintained at 20° C. for 21 hours, then the dimethyl-formamide is removed in a high vacuum and the residual oil is triturated with water, while cooling with ice, during which it gradually becomes granular. The powder is washed several times with water, then with dilute bicarbonate solution and water, and dried. The crude product (3.70 grams) is washed for further purification with acetone and methanol, and yields 0.68 gram of N-carbobenzyloxy-L-asparaginyl-nitro - L - arginyl-L-valyl-L-tyrosyl-L-isoleucyl-L-histidyl-L-prolyl-L-phenylalanine methyl ester melting at 190–205° C. and having the specific rotation $$[\alpha]_D^{23}=-29°\pm4°$$

(c.=0.52 in dimethyl-formamide). The product is sparingly soluble in the usual organic solutions except in dimethyl-formamide. It is soluble in very dilute hydrochloric acid.

The L-isoleucyl-L-histidyl-L-prolyl-L-phenylalanine methyl ester used as starting material is prepared as described below in Example 36.

*Example 27.—L - asparaginyl - L - arginyl - L - valyl-L-tyrosyl - L - isoleucyl - L - histidyl - L - prolyl-L-phenylalanine methyl ester.*

370 milligrams (0.3 millimol) of carbobenzyloxy-L-asparaginyl-nitro-L-arginyl-L-valyl-L-tyrosyl-L-isoleucyl-L-histdiyl-L-prolyl-L-phenylalanine methyl ester are suspended in 15 cc. of methanol and brought into solution by the addition of 1.0 cc. of a 1.24 N-solution of hydrochloric acid (4-equivalents) in methanol. A trace of flocks is removed by filtration and the solution is hydrogenated in the presence of 100 milligrams of palladium-charcoal (10% Pd) at room temperature under atmospheric pressure (a second hydrogenation vessel charged with dilute caustic soda solution being used to absorb the carbon dioxide evolved). The hydrogenation is complete in 13 hours and after the absorption of somewhat more than the calculated quantity of hydrogen. The solution is then filtered to remove the catalyst and the filtrate is evaporated to dryness in vacuo. The residue (resin) weighs 310 milligrams (calculated for a mixture of equimolecular quantities of the trihydrochloride and ammonium chloride=360 milligrams). The product is further treated without purification. It is easily soluble in water but is sparingly soluble in aqueous alkalies, and is soluble in methanol and insoluble in ether.

*Example 28.—L - asparaginyl - L - arginyl - L - valyl - L - tyrosyl - L - isoleucyl - L - histidyl - L - prolyl - L - phenylalanine*

An 0.1 N-solution of caustic soda is added in several portions to a solution of 256 milligrams (25 millimols) of L - asparaginyl - L - arginyl - L - valyl - L - tyrosyl - L - isoleucyl - L - histidyl - L - prolyl - L - phenylalanine methyl ester in 12.0 cc. of methanol of 66% strength until the pH value of the solution remains at 10.5–11.0 for 20 minutes (a total of 18 cc. of the caustic soda solution is added). After a total of 30 minutes the pH value is adjusted to 8 by the addition of a little solid carbon dioxide, a flocculent precipitate (25 milligrams) is removed by filtration, and the filtrate is freed from methanol in vacuo. The aqueous solution (volume of 15 cc.) is mixed with a few cc. of dilute sodium carbonate solution, and the whole is agitated at a pH value of 9 four times with 100 cc. of n-butanol saturated with water each time. The butanol extracts are washed once with 8 cc. of dilute sodium sulfate solution, dried with sodium sulfate, and upon evaporation yield 195 milligrams of crude product. The latter is washed three times with 5 cc. of dry n-butanol on each occasion, whereby 30 milligrams of the more easily soluble constituents are removed. The greater part (135 milligrams) of the L-asparaginyl-L-arginyl-L-valyl-L-tyrosyl-L-isoleucyl-L-histidyl-L-prolyl-L-phenylalanine is sparingly soluble in dry butanol and is obtained in the form of a colorless finely granular deposit. The product is soluble in water and methanol.

The crude product (135 mg.) is subjected to a 32-stage multiplicative distribution (Craig's basic process) in the system n-butanol-water. The main quantity (75 mg.) of the active material is found in fractions 9–21 with a maximum in fraction 15 ($G=0.89$). Fractions 0–8 contain 45 mg. of a slowly migrating inactive impurity. Fractions 22–32 contain about 20 mg. of inactive material. A sample of the substance obtained from fraction 15 in the test apparatus of Peart has twice as strong an action on rats as nor-adrenaline (0.25γ per kilogram of body weight in 0.1 cc. of physiological salt solution injected intravenously, whereas nor-andrenaline gives 0.5γ).

The material from fractions 9–21 is combined and again distributed in the same manner. Activity is again found in fractions 9–22, which contain a total of 32 mg. of material (maximum in fraction 16). Fractions 0–8 contain 20 milligrams of inactive material and fractions 23–32 contain about 15 milligrams of inactive material.

A sample of the substance from fraction 16 when tested in the manner referred to above was 5–10 times as strong in its action as nor-adrenaline.

The material from fractions 9–22 is again combined and subjected to distribution in the system n-butanol/acetic acid of 4% strength in 30 stages (Craig's basic process). When the 30-stage distribution is complete, the pH value of all the fractions is brought to 5.5–6.0 by the addition of a small amount of a methanolic solution of ammonia, the solutions are evaporated to dryness at 40° C. under reduced pressure, and the residue is dried for 8 hours at 50° C. under 0.01 mm. pressure in order to remove ammonium acetate. Fractions 0–6 contain a total of 30 mg. of product (maximum in fraction 1, $k=0.051$). Fractions 7–30 contain no weighable constituents. The weight distribution curve of the amounts found experimentally in fractions 0–6 agrees with the quantity theoretically calculated. A sample of the product from fraction 1 showed in the aforesaid test of Peart an activity five times greater than that of nor-adrenaline. The L - asparaginyl - L - arginyl - L-valyl-L-tyrosyl - L - isoleucyl-L-histidyl-L-prolyl-L-phenylalanine so purified is obtained in the form of a colorless powder melting at 195–205° C. (with decomposition), after being dried in a high vacuum. In paper chromatography it exhibits in the systems ethanol/n-butanol/$H_2O$/diethylamine (100:100:50:20), n-butanol/acetone/$H_2O$/diethylamine (100:100:50:20), ethanol/n-butanol/$H_2O$ (100:100:50), n-butanol/glacial acetic acid/$H_2O$ (100:10, saturated with $H_2O$) and secondary butanol/ammonia solutions of 3% strength (120:44) on Whatmann No. 1 the $R_f$-values 0.37; 0.31; 0.18; 0.15 and 0.24 respectively. The spots exhibit the Pauly reaction. No ninhydrin-positive substances are detectable on the paper.

*Example 29.—L-asparagyl-L-arginyl-L-valyl-L-tyrosyl-L-isoleucyl-L-histidyl-L-prolyl-L-phenylalanine*

5 milligrams of L-asparaginyl-L-arginyl-L-valyl-L-tyrosyl-L-isoleucyl-L-histidyl-L-prolyl-L-phenylalanine are dissolved in 0.1 ml. of concentrated hydrochloric acid, and the solution is allowed to stand for 100 minutes at 39° C. The solution is then evaporated to dryness in a high vacuum, the residue is pulverized and then dried at 40° C. in a high vacuum. The resulting L-asparagyl-L-arginyl-L - valyl - L - tyrosyl - L - isoleucyl - L - histidyl - L-prolyl-L-phenylalanine (hypertensin II) can be separated from the non-hydrolysed starting material by the Craig distribution or by chromatography on a cellulose column with a suitable spectrum of solvents, for example, butanol/methanol/0.33 molar $NH_4COOH$ (3:1:4; pH=6.5) or secondary butanol/ammonia solution of 3% strength (120:44). It is a water-soluble colorless powder having an $R_f=0.2$ in the system secondary butanol/ammonium solution of 3% strength.

*Example 30.—N-carbobenzyloxy-L-valyl-L-tyrosine-methylester*

A solution of 68.1 grams (0.275 mol) of carbobenzyloxy-L-valine and 50.9 grams (0.261 mol) L-tyrosine-methyl ester in 1 liter of tetrahydrofurane is mixed with 59.2 grams of 1:3-dicyclohexyl-carbodiimide and the solution is allowed to stand for 16 hours at 21° C. Thereupon the separated dicyclohexyl-urea is filtered off with suction (46.0 grams corresponding to 77% of the theoretical yield, and melting at 218–224° C.), and the filtrate evaporated to dryness. The residue (a viscous oil) is triturated with 300 cc. of hot petroleum ether until crystallization commences. The crystals formed are filtered off with suction and washed with a large amount of hot petroleum ether. Recrystallization from a mixture of acetone and petroleum ether gives a total quantity of 91 grams (81%) of carbobenzyloxy-L-valyl-L-tyrosine-methyl ester (V) M.P. 144–147° C., $$[\alpha]_D^{22} = +19° \pm 4°$$

(c.=1.06 in chloroform).

From the remaining petroleum ether solution and also from the mother liquor from the crystals referred to, a total quantity of 17 grams of a by-product is obtained of M.P. 128–130° C. (from petroleum ether). This product is 1-(carbobenzoxy-L-valyl)-1:3-dicyclohexyl-urea.

*Example 31.—L-valyl-L-tyrosine-methyl ester*

(a) *L-valyl-L-tyrosine-methyl ester hydrobromide.—* 20.0 grams (0.0468 mol) of carbobenzoxy-L-valyl-L-tyrosine-methyl ester are dissolved in 200 cc. of a 1.1 N-solution of hydrobromic acid in glacial acetic acid. After 1 hour at 21° C. the mixture is evaporated to dryness under vacuum at a bath temperature of 45° C. and the remaining oil is triturated with a large amount of ether as a result of which the oil solidifies. The residue is washed with ether, and there are obtained 17.26 grams (98%) of L-valyl-L-tyrosine-methyl ester hydrobromide, M.P. 206–208° C. By recrystallization from methanol-ether, needles are obtained of M.P. 208–209° C.; $[\alpha]_D = +31° \pm 4°$ (c.=1.08 in methanol).

(b) *L-valyl-L-tyrosine-methyl ester.—*5.63 grams (15 mmol) of the hydrobromide obtained as described under (a) are suspended in 80 cc. of ethyl acetate and 2.1 cc. (15 mmol) of triethylamine are added. The precipitated crystals of triethylamine hydrobromide are filtered off with suction after 10 minutes (2.68 grams corresponding to 99% of the theoretical yield) and the filtrate is evaporated to dryness. The remaining L-valyl-L-tyrosine-methyl ester (resin 4.61 grams) is immediately further worked up as described in Example 24.

*Example 32.—N-carbobenzyloxyl-L-isoleucyl-L-histidine methyl ester hydrochloride*

To a solution of 44.0 grams (0.26 mol) of L-histidine methyl ester in 50 ml. of acetonitrile are added 55.5 grams (0.27 mol) of dicyclohexyl-carbodiimide, dissolved in 100 ml. of ethyl acetate, and 71.5 grams (0.27 mol) of N-carbobenzyloxy-L-isoleucine, dissolved in 700 ml. of ethyl acetate. Slight heating immediately takes place and soon afterwards crystalline dicyclohexyl urea separates. The whole is cooled with ice for a short time so that the temperature does not rise above about +30° C. After a few minutes there is produced from the mixture a jelly-like mass which is allowed to stand overnight at room temperature.

The mixture is filtered and the residue triturated twice, each time with 50 ml. of ethyl acetate, then filtered with suction, and finally dried under vacuum at 90° C. From the resulting mixture of dipeptide and dicyclohexyl-urea, the former is dissolved out with a solution of 25 ml. of concentrated hydrochloric acid in 20 ml. of water and 80 ml. of methanol, in the form of the hydrochloride, and the residue is again washed twice, in each case with 2 ml. of concentrated hydrochloric acid in 10 ml. of water and 20 ml. of methanol. The combined filtrates are evaporated under vacuum to dryness, and the residue is crystallized from a mixture of methanol and ethyl acetate. There are obtained 52.6 grams of dipeptide hydrochloride (equals 44.6% of the theoretical yield) melting at 170–172° C. with decomposition. From the mother liquors by further evaporation and dilution with ethyl acetate, a further 39.1 grams of hydrochloride (33.1% of the theoretical yield) melting at 160–165° C. (with decomposition) are obtained.

*Example 33.—N-carbobenzyloxy-L-isoleucyl-L-histidine hydrazide*

2.5 grams (0.0053 mol) of N-carbobenzyloxy-L-isoleucyl-L-histidine methyl ester hydrochloride monohydrate are boiled for 1 hour under reflux in 10 ml. of absolute methanol with 1.5 ml. of hydrazine hydrate. The solvent is evaporated under vacuum to a considerable extent, and the residue is treated with 100 ml. of ice water. The initially oily precipitate crystallizes after short standing at 0° C. The carbobenzyloxy-dipeptide hydrazide is filtered off, washed with a large amount of water, and dried under vacuum over phosphorus pentoxide and sulfuric acid. The crude yield is 1.82 grams (equals 83%); recrystallization once from boiling water gives 1.6 grams of analytically pure product; M.P.=186–187° C.; $[\alpha]_D^{20} = 51° \pm 4°$ (c.=1.327 in 1 N-hydrochloric acid); $[\alpha]_D^{20} = -22° \pm 4°$ (c.=0.558 in methanol).

The hydrazide is easily soluble in methanol, ethanol, acetone, ethyl acetate and N-hydrochloric acid, sparingly soluble in hot water, and insoluble in benzene, ether and petroleum ether.

*Example 34.—L-prolyl-L-phenylalanine methyl ester*

2.46 grams (0.006 mol) of carbobenzyloxy-L-prolyl-L-phenylalanine methyl ester are dissolved in 40 ml. of methanol, 6 equivalents of methanolic hydrochloric acid and 0.6 gram of palladium charcoal (10% Pd) are added, and hydrogenation is carried out at room temperature and under normal pressure, the carbon dioxide formed being absorbed in caustic soda. When somewhat more than the calculated quantity of hydrogen has been absorbed the hydrogenation ceases. The solution is filtered to remove the catalyst, and then evaporated under vacuum, and the residue is taken up in a little acetone. On addition of ether, the hydrochloride of L-prolyl-L-phenylalanine methyl ester separates out in crystalline form; yield: 1.62 grams (86%). After recrystallization twice from a mixture of acetone and ether, the substance melts at 157–158° C.; $[\alpha]_D^{23} = -41° \pm 1°$ (c.=4.15 in water).

For conversion into the free ester, a solution of 1.10 grams (0.0035 mol) of the hydrochloride in 1 ml. of water is covered with a layer of ethyl acetate and treated at 0° C., while shaking vigorously, with saturated potassium carbonate solution. The ethyl acetate extract is dried, evaporated under vacuum, and the residue is dried under 0.1 mm. pressure. The resulting L-prolyl-L-phenylalanine methyl ester (0.98 gram) is an oil, easily soluble in water and ether, which can be used directly for further reactions.

*Example 35.—N-carbobenzyloxy-L-isoleucyl-L-histidyl-L-prolyl-L-phenylalanine methyl ester*

A solution of 1.49 grams (0.035 mol) of N-carbobenzyloxy-L-isoleucyl-L-histidine hydrazide (Example 11) in 15 ml. of N-hydrochloric acid is extracted once with a little ethyl acetate, the ethyl acetate phase is washed with 3 ml. of N-hydrochloric acid, and the combined hydrochloric acid solutions are covered with a layer of ethyl acetate in a separating funnel, and the whole is cooled with ice to 0° C. Thereupon 275 mg. (0.004 mol) of sodium nitrite in 5 ml. of ice water are slowly added dropwise, reaction allowed to take place for three minutes, and the hydrochloric acid azide solution is rendered alkaline to phenolphthalein with 3 ml. of saturated potassium carbonate solution. The aqueous solution is extracted twice more with a large amount of ethyl acetate, while cooling with ice, and the organic phases are washed neutral with water.

The ice cold azide solution, dried over sodium sulfate, is filtered into a freshly prepared solution, freed from triethylamine hydrochloride and cooled to 0° C., of L-prolyl-L-phenylalanine methyl ester, prepared from 1.24 grams (0.004 mol) of L-prolyl-L-phenylalanine methyl ester hydrochloride and 0.55 ml. (0.004 mol) of triethylamine in 15 ml. of absolute ethyl acetate.

Reaction is allowed to take place for 18 hours at 0–5° C. and 2 hours at room temperature, the solvent is evaporated under vacuum at 40° C. to half the volume, and the residue is washed with N-hydrochloric acid, ice cold 2 N-sodium carbonate solution and with water until neutral, dried over sodium sulfate, and the ethyl acetate is evaporated under vacuum.

The yield is 2 grams (85%) of yellowish amorphous carbobenzyloxy-tetrapeptide ester. A 36 stage distribution between 80% methanol and a mixture of chloroform and carbon tetrachloride (1:1) gives 1.6 grams of pure N-carbobenzyloxy-L-isoleucyl - L - histidyl-L-prolyl-L-phenylalanine methyl ester. An analysis fraction, after reprecipitation once from methanol-water has a melting point 105–110° C.; $[\alpha]_D^{22} = -56° \pm 4°$ (c=0.971 in methanol).

The N-carbobenzyloxy-tetrapeptide ester is of good solubility in most organic solvents with the exception of ether and petroleum ether.

*Example 36.—L-isoleucyl - L - histidyl - L - prolyl-L-phenylalanine methyl ester*

(a) *Dihydrobromide.*—1.72 grams (2.61 mmol) of N-carbobenzyloxy - L - isoleucyl - L - histidyl-L-prolyl-L-phenylalanine methyl ester are mixed with 8.3 cc. of 1.1 N-hydrogen bromide in glacial actic acid, whereupon solution immediately takes place. After 2 hours standing at 21° C., the glacial acetic acid is completely distilled off at 25° C. under 0.1 mm. pressure, and the remaining resin is triturated with ether whereby it becomes granular. The crude L-isoleucyl-L-histidyl-L-prolyl-L-phenylalanine methyl ester dihydromromide weighs 1.79 grams, M.P. 130–140° C.

(b) *Free ester.*—1.96 grams (2.85 mmol) of L-isoleucyl-L-histidyl-L-prolyl-L-phenylalananine methyl ester dihydrobromide are dissolved in a little water, a slight turbidity is removed by washing with a little ethyl acetate, the aqueous solution is treated with 50 cc. of chloroform, and saturated potassium carbonate solution is added with ice cooling until the pH of the aqueous phase amounts to 10. The separated ester dissolves easily in the chloroform phase on shaking. The chloroform solution is washed once with a little saturated sodium sulfate solution. Potassium carbonate and sodium sulfate solutions are washed with a further 30 cc. of chloroform. After drying with sodium sulfate and evaporation, the chloroform solutions leave as a residue 1.31 grams of L-isoleucyl-L-histidyl-L-prolyl-L-phenylalanine methyl ester (VIII) as a resin, which is immediately further worked up (cf. Example 5); yield 88%.

*Example 37.—N-carbobenzyloxy - L - asparaginyl-nitro-L-arginyl - L - valyl - L - tyrosyl-L-valyl-L-histidyl-L-prolyl-L-phenylalanine methyl ester*

A solution of 467 mg. (1 mmol) of N-carbobenzyloxy-L-asparaginyl-nitro-L-arginine and 272 mg. (0.35 mmol) of L-valyl-L-tyrosyl-L-valyl-L-histidyl-L-prolyl-L-phenylalanine methyl ester in 2.5 ml. of dimethyl-formamide is treated with 237 mg. (1 mmol) of 1-cyclohexyl-3-morpholinylethyl-carbodiimide. After 24 hours standing at room temperature, the reaction solution is freed from dimethyl-formamide at 35° C. under 0.1 mm. pressure. The residue is triturated with ice water, and the separated solid material is washed with water and dried under vacuum at 30° C. The crude product is triturated with acetone, then extracted with boiling acetone, and finally washed with ice cold methanol. The material thus purified (289 mg. 67%) is a faintly yellowish powder of M.P. 207–210° C.

For further purification, the substance is distributed in counter-current between n-butanol and 0.1% acetic acid in 30 stages (k=4.17). Fractions 23–38 yield 132 mg. of pure product and fractions 17–22 (74 mg.) give on further distribution another 34 mg. of pure material; total 166 mg. (39%). After reprecipitation twice from methanol the substance melts at 214–216° C.; $[\alpha]_D^{23} = -27° \pm 2°$ (c=2.22 indimethyl-formamide).

The L-valyl - L - tyrosyl-L-valyl-L-histidyl-L-prolyl-L-phenylalanine methyl ester is prepared as described below (Example 19 et seq.).

*Example 38.—L-asparaginyl-L-arginyl-L-valyl-L-tyrosyl-L-valyl-L-histidyl-L-prolyl-L-phenylalanine methyl ester*

85 mg. (0.07 mmol) of N-carbobenzyloxyl-L-asparaginyl-nitro-L-arginyl - L - valyl-L-tyrosyl-L-valyl-L-histidyl-L-prolyl-L-phenylalanine methyl ester are suspended in 10 ml. of methanol, brought into solution by the addition of 0.3 molar equivalents of methanolic hydrochloric acid and shaken at room temperature under normal pressure for 15 hours in a hydrogen atmosphere in the presence of 0.3 gram of palladium-charcoal (10% Pd). The neutral solution is filtered from the catalyst and evaporated under vacuum. The semi-solid reaction product is washed with acetone and gives after precipitation from a mixture of methanol and ether 51 mg. (63%) of the trihydrochloride of the octapeptide methyl ester.

*Example 39.—L-asparaginyl-L-arginyl-L-valyl-L-tyrosyl-L-valyl-L-histidyl-L-prolyl-L-phenylalanine*

(a) 48 mg. (0.042 mmol) of L-asparaginyl-L-arginyl-L-valyl-L-tyrosyl-L-valyl - L - histidyl-L-prolyl-L-phenylalanine methyl ester tri-hydrochloride are suspended in 0.5 ml. of methanol, and treated gradually in the course of 1 hour with 0.3 ml. of N-caustic soda solution (about 7 equivalents) so that the pH value of the solution is maintained between 10.5 and 11.5. After a further 30 minutes the solution is freed from methanol under vacuum at room temperature, adjusted with 1 N-acetic acid to pH 7.4 and lyophilised. The residual mixture of free peptide and inorganic salts (79 mg.) is fractionated by counter-current distribution in the system butanol/0.1 N-ammonium hydroxide. The pure octapeptide is obtained as a colourless powder which is soluble, in water and methanol, more sparingly soluble in ethanol, and insoluble in acetone.

(b) 400 milligrams of crude octapeptide methyl ester (containing about 3 mols HCl+1 mol NH₄Cl) are dissolved in 4 ml. of methanol (clear brown-yellow solution), and, after the addition of 8 ml. of a 1 N-solution of potassium carbonate in water, the whole is stirred at room temperature for one hour. Finally the solution, which contains a small amount of brown flocks in the form of a deposit, is neutralised with 4 N-hydrochloric acid to a pH value of 6, then frozen with a mixture of acetone and carbon dioxide, and lyophilised overnight in a high vacuum. There are obtained 930 milligrams of a brownish powder which contains about 590 milligrams of potassium chloride in addition to the peptide.

The whole of the latter powder is distributed through 30 stages in the system n-butanol/C. 33 molar $NH_4COOH$ (ammonium formate) in water (pH=6.5). Each phase has a volume of 10 cc.

The free octapeptide has a G=0.17 and is isolated from the combined contents of tubes 0–8 by extraction three times with 400 cc. of a mixture of butanol and methanol (3:1) each time, the organic solution is washed twice with 30 ml. of an aqueous solution of ammonium formate of 5% strength each time. After evaporating the mixture at 45° C. under 11 mm. pressure and drying it in a high vacuum for 8 hours at 40° C., there is obtained a total of 190 milligrams of a white powder which is easily soluble in water, and which in biological tests on rats from which the kidneys have been removed exhibits an action 20 times as strong as that of nor-adrenaline.

As tested by paper chromatography the product is unitary, and has an $R_f$-value of 0.19 in the system secondary butanol/ammonia solution of 3% strength (120:44).

As a second fraction there are obtained in the distribution from tubes 18–30 (G=42) 140 milligrams more of non-hydrolysed starting material (octapeptide methyl ester). $R_f$-value in the above system=0.30.

(c) 500 milligrams of octapeptide methyl ester (same starting material as under (a) above) are dissolved in 2 ml. of concentrated hydrochloric acid, and the mixture is allowed to stand for 100 minutes at 39° C. The solution is then evaporated to dryness in a high vacuum, and the residue is finely pulverised and further dried for a few hours at 0° C. in a high vacuum. There are obtained 510 milligrams of a pale brown crude product, which exhibits in rats deprived of their kidneys 20 times the activity of nor-adrenaline.

For purification 300 milligrams of the above product are dissolved in 2 ml. of water, then neutralized with 2 N-caustic soda solution to a pH value of 6, and distributed through 30 stages in the system n-butanol/methanol/0.33 molar ammonium formate (3:1:4; pH=6.5), the volume of each phase being 10 ml. From tubes 5–14 there are obtained by working up as described under (a) 170 milligrams of hydrolysate in the form of a colorless substance soluble in water, which exhibits in rats deprived of their kidneys 20–25 times the activity of nor-adrenaline. In paper chromatography in the system secondary butanol/ammonia solution of 3% strength (120:44) the product splits up into two compounds having the $R_f$-values 0.13 and 0.19, respectively. The second patch exhibits the greater color intensity with ninhydrin.

The compound having the $R_f$-value 0.13 is L-asparagyl-L-arginyl-L-valyl-L-tyrosyl-L-valyl-L-histidyl - L - prolyl-L-phenylalanine, whereas the compound having the $R_f$-value 0.19 is the octapeptide containing the asparaginyl residue.

Tubes 15–19 of the Craig distribution contain 55 milligrams of mixed fraction, and 22 milligrams of starting material are recovered from tubes 20–29 ($R_f$=0.30).

In addition to being attained by the Craig distribution in a large number of stages, the two hydrolysis products (asparaginyl-and asparagyl-compounds) can also be completely separated from one another by chromatography through a column of paper powder with suitable solvent systems, for example, butanol/methanol/ammonium formate.

*Example 40.—N - carbobenzyloxy - L-valyl-L-tyrosyl-L-valyl-L-histidyl-L-prolyl-L-phenylalanine methyl ester*

1.95 grams (0.003 mol) of carbobenzyloxy-L-valyl-L-tyrosyl-L-valyl-L-histidine are suspended in 10 ml. of dimethylformamide, and treated with 0.83 grams (0.003 mol) of L-prolyl-L-phenylalanine methyl ester and 0.84 gram (0.0035 mol) of 1-cyclohexyl-3-morpholinyl ethylcarbodiimide. After 1 hour the starting material is completely dissolved. The reaction solution is left to stand overnight at room temperature, then freed from dimethyl-formamide under 0.1 mm. pressure, and the residue is treated with ice water. The separated solid material is washed twice with 2 N-hydrochloric acid, as a result of which the reaction product forms a hydrochloride which is soluble in water but not in 2 N-hydrochloric acid. Re-conversion into the basic form is effected by treatment with 0.5 N-potassium carbonate solution, and the product is washed several times with water and dried under vacuum at 35° C. The resulting crude product (2.40 grams) is taken up in 100 ml. of acetone, filtered from insoluble material (0.30 gram) and evaporated under vacuum. By trituration with ethyl acetate the residue gives 1.57 grams (58%) of solid material melting at 151–156° C.

For further purification, 1 gram of this substance is subjected to counter-current distribution in the system methanol-water 4:1/chloroform-carbon tetrachloride 1:1 over 48 stages. The major quantity of the material (0.84 gram) is present in fractions 15–28 with a weight maximum in fraction 21 ($k$=0.78). These fractions, after reprecipitation from acetone give 0.66 gram of amorphous material of M.P. 158–162° C. After repeated reprecipitation from a large amount of acetone, the substance has a melting point of 161–163° C. and $[\alpha]_D^{24}$=−56°±2° ($c$.=1.38 in ethanol).

The carbobenzyloxy-L-valyl-L-tyrosyl-L-valyl-L-histidine used as starting material is prepared as described in Examples 17/18.

*Example 41.—L-valyl-L-tyrosyl-L-valyl-L-histidyl-L-prolyl-L-phenylalanine methyl ester*

635 mg. (0.7 mmol) of carbobenzyloxy-L-valyl-L-tyrosyl-L-valyl-L-histidyl-L-prolyl-L-phenylalanine methyl ester are triturated with 1 ml. of glacial acetic acid until a uniform solution is produced and this is then treated with 1.9 ml. of 1.6 N-hydrobromic acid (3 mmol) in glacial acetic acid. On standing at room temperature, the reaction product commences to separate as an oil after 10 minutes. The mixture is shaken for 2½ hours and then evaporated as far as possible at 30° C. under 0.1 mm. pressure. After washing with ether and acetone, the residue gives 648 mg. of the dihydrobromide of the sexapeptide methyl ester as an almost colorless powder.

For conversion into the free ester, a solution of 562 (0.6 mmol) of this substance in 2 ml. of water is rendered strongly alkaline with saturated potassium carbonate solution at 0° C. and extracted 4 times, each time with 20 ml. of cold chloroform. The chloroform extracts are washed with a little water, dried and evaporated under vacuum. On trituration with ether the oily residue yields 272 mg. (59%) of the peptide ester as a faintly yellow powder which is used as such for further reaction.

*Example 42.—N - carbobenzyloxy-L-asparaginyl-nitro-L-arginyl - L - valyl - L - tyrosyl-L-leucyl-L-histidyl-L-propyl-L-phenylalanine methyl ester*

760 milligrams (0.96 millimol) of L-valyl-L-tyrosyl-L-leucyl-L-histidyl-L-propyl-L-phenylalanine methyl ester and 1.35 grams (2.88 millimols) of N-carbobenzyloxy-L-asparaginyl-nitro-L-arginine in 10 ml. of dimethyl-formamide are mixed with 690 milligrams (2.9 millimols) of 1-cyclohexyl-3-(morpholinyl-ethyl)-carbodiimide and the whole is allowed to react for 2 days at room temperature. The dimethyl-formamide is then removed in a high vacuum and the residual oil is triturated five times with 5 ml. of water each time while cooling with ice, whereby partial fluocculation occurs.

The crude product, 2.4 grams, is purified by repeated washing with a large quantity of ice-cold acetone and methanol, and 250 milligrams of carbobenzyloxy-octapeptide ester are obtained. From the acetone extracts and methanol extracts a further 180 milligrams of carbobenzyloxy-octapeptide ester is obtained.

The crude carbobenzyloxy - L - asparaginyl-nitro-L-arginyl - L - valyl - L-tyrosyl-leucyl-histidyl-L-propyl-L-phenylalanine methyl ester (430 milligrams) melts at 175°–190° C. and is used as such for further working up.

The L - valyl - L-tyrosyl-L-leucyl-L-histidyl-L-propyl-L-phenylalanine methyl ester used as starting material can be prepared as described below in Examples 46 and 47.

*Example 43.—L - asparaginyl-L-arginyl-L-valyl-L-tyrosyl-L - leucyl-L-histidyl-L-propyl-L-phenylalanine methyl ester*

410 milligrams (0.33 millimol) of carbobenzyloxy-asparaginyl - nitro - L-arginyl-L-valyl-L-tyrosyl-L-leucyl-L-histidyl-L-prolyl-L-phenylalanine methyl ester are suspended in 10 ml. of methanol, and brought into solution by the addition of 1 ml. of 1.39 N-methanolic hydrochloric acid (4 equivalents). The flocculent impurities are filtered off, and the solution is hydrogenated in the presence of 250 milligrams of palladium-charcoal (10% of palladium) under normal conditions. The carbon dioxide formed is absorbed in a second hydrogenation vessel with dilute caustic soda solution. The hydrogenation ceases after 4½ hours when somewhat more than the calculated quantity of hydrogen has been absorbed. The catalyst is filtered off and the solution is evaporated to dryness in vacuuo at 40° C. There are obtained 360 milligrams of a resin (406 milligrams calculated for the trihydrochloride and the equimolecular amount of ammonium chloride).

The product is worked up without further purification. It dissolves well in water and methanol.

*Example 44.—L - asparaginyl-L-arginyl-L-valyl-L-tyrosyl-L-leucyl-L-histidyl-L-prolyl-L-phenylalanine*

360 milligrams of crude L - asparaginyl - L - arginyl-L-valyl - L - tyrosyl-L-leucyl-L-histidyl-L-prolyl-L-phenylalanine ester trihydrochloride are dissolved in 10 mol of methanol of 66% strength and a 1/10 N-solution of caustic soda is added in portions so as to maintain the pH value of the solution at 10.5–11 for 20 minutes. (Total consumption of the caustic soda solution=18.5 ml). The solution is brought to a pH value of 7–8 with solid carbon dioxide, and the separated impurities (10–20 milligrams) are filtered off, the methanol is evaporated to a far-reaching extent at 35° C. in vacuo, and the pH value of the solution is adjusted to 9 with a 2 N-solution of sodium carbonate.

The aqueous solution is extracted four times with 100 ml. of n-butanol saturated with water each time, the butanol extracts are washed once with 10 ml. of sodium sulfate solution and dried over sodium sulfate. The residue obtained by evaporation is washed three times with 3 ml. of dry butanol each time, whereby 50 milligrams of easily soluble constituents are removed.

There are obtained 190 milligrams of L-asparaginyl-L-arginyl - L - valyl-L-tyrosyl-L-leucyl-L-histidyl-L-prolyl-L-phenylalanine in the form of a fine light grey powder which dissolves well in water and methanol.

In tests on rats a sample of the crude product exhibits the same strong activity as nor-adrenaline.

*Example 45.—L - asparagyl-L-arginyl-L-valyl-L-tyrosyl-L-leucyl-L-histidyl-L-propyl-L-phenylalanine*

2.08 grams, (1.7 millimols) of L-asparaginyl-L-arginyl-L - valyl-L-tyrosyl-L-lecuyl-L-histidyl-L-prolyl-L-phenylalanine methyl ester trihydrochloride (see Example 28), which has been reprecipitated once from a mixture of methanol and acetone, are heated in concentrated hydrochloric acid at 57° C. for 85 minutes. In about 10–15 minutes a clear solution is obtained. The hydrochloric acid is rapidly evaporated under reduced pressure at 25° C., and the residue is dried in a high vacuum over potassium hydroxide and phosphorous pentoxide.

The yield is 2 grams of amorphous-L-asparagyl-L-arginyl - L - valyl-L-tyrosyl-L-leucyl-L-histidyl-L-prolyl-L-phenylalanine trihydrochloride, which is still contaminated with ammonium chloride.

1.26 grams of the crude product are dissolved in 20 ml. of ethanol, and the peptide is again precipitated with 120 ml. of acetone. Two further reprecipitations yield 1.08 grams of white granular octapeptide trihydrochloride. In tests on animals the unprecipitated product exhibits the same activity as nor-adrenaline (test according to Peart) and double the activity in the case of rats deprived of their kidneys.

A test portion (200 milligrams) of the reprecipitated L - asparagyl - L - arginyl-L-valyl-L-tyrosyl-L-leucyl-L-histidyl-L-prolyl-L-phenylalanine trihydrochloride is distributed by the method of Craig in 30 stages between n-butanol and 0.3 cc. of ammonium acetate (1:1). (pH=6.5–7.) G=0.67. The solutions are evaporated in vacuo at 40° C., and the ammonium acetate is sublimed in a high vacuum at 40° C. for 30 minutes.

Fractions 7–16 (maximum in fraction 12) exhibit the same activity in the Peart test as the non-distributed product.

Determinations of ammonia and total nitrogen show that the asparagine is hydrolysed mainly to asparaginic acid in the acid hydrolysis.

*Example 46.—N - carbobenzyloxy-L-valyl-L-tyrosyl-L-leucyl-L-histidyl-L-prolyl-L-phenylalanine methyl ester*

A solution of 2.1 grams (0.005 mol) of N-carbobenzyloxy-L-valyl-L-tyrosine in 10 ml. of dry acetonitrile is treated with 1.16 grams (5% excess) of dicyclohexylcarbodiimide and a solution of 2.68 grams (0.005 mol) of L-leucyl-L-histidyl-L-prolyl-L-phenylalanine methyl ester in 10 ml. of acetonitrile. As a result, the dicyclohexyl urea separates out momentarily. After about 5 hours the separation commences as a gelatinous mass of the N-carbobenzyloxy-hexapeptide ester. The whole is allowed to stand for 20 hours at room temperature and then the acetonitrile evaporated off at 40° C. under reduced pressure. The evaporation residue is digested with 10 ml. of ice cold methanol and washed five times further, in each case with 1 ml. of cooled methanol. The methanol is evaporated under vacuum and the residue taken up in chloroform and washed three times with 2 N-hydrochloric acid (the first time with 5 ml. and subsequently twice with 2 ml.), fiive times each time with 2 ml. of ice cold sodium bicarbonate solution and then until neutral with water. The solution, dried over sodium sulfate, is concentrated to one half and boiled for a short time with active charcoal.

Complete evaporation of the solvent gives 4.2 grams of crude N-carbobenzyloxy-hexapeptide ester which is still contaminated with a little dicyclohexyl urea. The crude carbobenzoxy ester is dissolved in a little cold acetone, filtered off from residual dicyclohexyl urea and reprecipitated with much ether.

3.7 grams (79%) of N - carbobenzyloxy-L-valyl-L-tyrosyl - L - leucyl - L - histidyl-L-prolyl-L-phenylalanine methyl ester are obtained.

The substance prepared for analysis, after two further purifications from aceone/ether, has a melting point 142–147° C./149° C.; $[\alpha]_D^{24} = -60° \pm 4°$ (c.=1.291 in methanol).

The L - leucyl - L - histidyl - L - prolyl - L - phenylalanine methyl ester can be prepared as described in Example 49 below.

*Example 47.—L-valyl-L-tyrosyl-L-leucyl-L-histidyl-L-prolyl-L-phenylalanine methyl ester*

To 970 mg. (~0.001 mol) of N-carbobenzyloxy-L-valyl - L - tyrosyl-L-leucyl-L-histidyl-L-prolyl-L-phenylalanine methyl ester are added 6 ml. of an approximately 2 N-solution of hydrogen bromide in glacial acetic acid. As a result the substance agglomerates to a sticky mass. After stirring for one hour with a Magnet stirrer, clear solution occurs; reaction is allowed to continue for a further hour at room temperature, the glacial acetic acid is then evaporated under vacuum at 40° C. and the residue is ground twice with absolute ether. The granular dihydrobromide of L - valyl - L - tyrosyl-L-leucyl-L-histidyl-L-prolyl - L - phenylalanine methyl ester is dissolved in 10 ml. of water, the aqueous solution extracted once with a little ethyl acetate, the acetate phase washed once with 2 ml. of water and the combined aqueous solutions freed under vacuum from dissolved ethyl acetate. The cooled solution is adjusted to pH 8 with 2 N-sodium bicarbonate solution, filtered from separated hexapeptide ester and washed until neutral with ice water. The dried product (730 mg.=89%) melts at 130–140° C. and can be purified from chloroform/ether.

$[\alpha]_D^{24} = -53° \pm 4°$ (c.=0.636 in methanol)

*Example 48.—N-carbobenzyloxy-L-leucyl-L-histidyl-L-prolyl-L-phenylalanine methyl ester*

A solution of 6.6 grams (0.0158 mol) of N-carbobenzyloxy-L-leucyl-L-histidine hydrazide (obtained as described in Example 34 below) in 50 ml. of N-hydrochloric acid is extracted once with a little ethyl acetate, the ethyl acetate solution washed with 5 ml. of N-hydrochloric acid and the combined hydrochloric acid solutions covered with a layer of fresh ethyl acetate and cooled to 0° C. Slow treatment is then carried out with a solution, cooled to 0° C. of 1.14 grams (0.0165 mol) of sodium nitrite in 5 ml. of water, the whole is left for 5 minutes and the hydrochloric acid azide solution rendered alkaline to phenolphthalein with 9 ml. of saturated sodium carbonate solution. The aqueous phase is extracted twice further, with ice cooling, with much ethyl acetate and then the ethyl acetate solutions washed until neutral with water and dried over sodium sulfate.

From 5 grams (0.016 mol) of L-prolyl-L-phenylalanine methyl ester hydrochloride, suspended in 50 ml. of dry ethyl acetate, by the addition of 2.25 ml. (0.0162 mol) of triethylamine a solution of the free L-prolyl-L-phenylalanine methyl ester is obtained. This solution is cooled to 0° C. and treated with the azide solution prepared as described above.

After 18 hours standing at 0–5° C. and 2 hours at room temperature, one third of the solvent is evaporated off under vacuum at 40° C. and the residue is washed with N-hydrochloric acid, ice cold 2 N-sodium carbonate solution and until neutral with water. The hydrochloric acid, sodium carbonate and water extracts are again washed with much ethyl acetate in two further separating funnels.

After the evaporation of the ethyl acetate, 9.17 grams (87%) of N - carbobenzyloxy - L - leucyl-L-histidyl-L-prolyl-L-phenylalanine methyl ester are obtained as an amorphous powder.

The multiplicative distribution over thirty six stages by the Craig method of 1.32 grams of carbobenzyloxy-tetrapeptide ester between 80% methanol and chloroform: carbon tetrachloride 1:1 gives 1.2 grams of pure product. A preparation for analysis, after a single recrystallization from methanol-water, has an M.P. 110–115° C. $[\alpha]_D^{24} = -57° \pm 4°$ (c.=1.031 in methanol).

The N-carbobenzyloxy - L - leucyl - L - histidyl - L-prolyl-L-phenylalanine methyl ester is of good solubility in alcohol, methanol, acetone, ethyl acetate and quite dilute hydrochloric acid; it is insoluble in petroleum ether and ether.

*Example 49.—L-leucyl-L-histidyl-L-prolyl-L-phenylalanine methyl ester*

3.4 grams (0.005 mol) of carbobenzyloxy-L-leucyl-L-histidyl-L-prolyl-L-phenylalanine methyl ester in 30 ml. of absolute methanol are hydrogenated, with the addition of two equivalents of methanolic hydrochloric acid in the presence of 600 mg. of palladium charcoal (10% Pd) at room temperature until the reaction comes to a standstill. After about 1¾ hours a little more than the calculated quantity of hydrogen has been taken up. The catalyst is filtered off and the solution evaporated under vacuum at 40° C. The residue is dissolved in 5 ml. of ice cold water, covered with a layer of 50 ml. of cooled chloroform and rendered alkaline to phenolphthalein with saturated potassium carbonate solution. The aqueous solution is extracted twice further with 20 ml. of chloroform each time, the organic phases being washed with concentrated sodium sulfate solution and dried over sodium sulfate. After evaporation of the solvent 2.68 grams of amorphous tetrapeptide ester remain which can be used directly for further reaction.

*Example 50.—N-carbobenzyloxy-L-leucyl-L-histidine hydrazide*

10 grams (0.024 mol) of N-carbobenzyloxy-L-leucyl-L-histidine methyl ester (obtained according to Example 36 below), dissolved in 40 ml. of absolute ethanol, are treated with 3 ml. of hydrazine hydrate and reaction allowed to proceed for 2 days at room temperature. The solvent is evaporated at 40° C. under vacuum and the residue ground with 100 ml. of water. After 3 hours standing at 0° C., the liquid is filtered from crystalline precipitate, portions of 20 ml. of water are used for washing and the crude hydrazide is dried over sulfuric acid and $P_2O_5$.

Crystallization from 100 ml. of boiling water gives 6.8 grams (68%) of pure carbobenzyloxy-L-leucyl-L-histidine hydrazide, M.P. 168–169° C., $[\alpha]_D^{22} = -27° \pm 4°$ (c.=0.808 in methanol)

and $[\alpha]_D^{22} = -52° \pm 4°$ (c.=0.733 in N—HCl).

The hydrazide is of good solubility in cold ethanol and methanol and in cold N-hydrochloric acid but is only soluble in warm acetone and insoluble in ethyl acetate.

*Example 51.—N-carbobenzyloxy-L-leucyl-L-histidine methyl ester*

To a solution of 16.9 grams (0.1 mol) of L-histidine methyl ester and 21.6 grams (0.105 mol) of dicyclohexylcarbodiimide in 100 ml. of absolute ethyl acetate and 20 ml. of acetonitrile are added all at once 26.5 grams (0.1 mol) of N-carbobenzyloxy-L-leucine, dissolved in 200 ml. of ethyl acetate and the mixture, which soon solidifies to a jelly, is shaken for 30 minutes at room temperature. After leaving to stand overnight, the solvent is withdrawn as well as possible by suction from the friable mass (with repeated rubbing of the filter residue with a little fresh ethyl acetate) and dried under vacuum at 90° C. 47.8 grams are obtained of a mixture of dicyclohexyl urea and dipeptide, from which the latter is dissolved out using three portions of 50 ml. each of cold methanol. The combined extracts still contain small quantities of dicyclohexyl urea and are purified by dissolving in methanol and repeated precipitation with ethyl acetate-petroleum ether. 29.3 grams are obtained of N-carbobenzyloxy - L - leucyl - L - histidine methyl ester (70.5% of the theoretical yield) of M.P. 131–132° C.

From the filtrate of the reaction mixture, by extraction with 2 N-hydrochloric acid, 4.0 grams of dipeptide (9.5% of the theoretical yield) of M.P. 120–125° C. are also obtained, which can be further purified by reprecipitation from methanol-ethyl acetate-petroleum ether.

*Example 52.—N - carbobenzyloxy-L-asparaginyl-($N_\epsilon$-carbobenzyloxy)-L-lysyl - L - valyl - L-tyrosyl-L-leucyl-L-histidyl-L-prolyl-L-phenylalanine methyl ester*

330 mg. (0.42 mmol) of L-valyl-L-tyrosyl-L-leucyl-L-histidyl-L-prolyl-L-phenylalanine methyl ester (see Example 32) and 445 mg. (0.84 mmol) of N-carbobenzyloxy - L - asparaginyl - ($N_\epsilon$-carbobenzyloxy)-L-lysine (see Examples 55 and 56 below) are dissolved in 3 cc. of dimethyl formamide, 200 mg. (0.84 mmol) of 1-cyclohexyl-3-morpholinylethyl-carbodiimide added and the reaction mixture left for 21 hours at 22° C. The whole is then evaporated under high vacuum at 45° C. to dryness and the residual oil washed with small portions of water, very dilute ammonia solution and water, as a result of which it gradually solidifies. The powder is filtered with suction, dried (520 mg.) and further washed with acetone and finally with methanol, whereby N-carbobenzyloxy-L-asparaginyl-($N_\epsilon$-carbobenzyloxy) - L - lysyl - L - valyl-L-tyrosyl - L - leucyl-L-histidyl-L-prolyl-L-phenylalanine methyl ester is obtained in the form of a grey, methanol-insoluble power. M.P. about 190–205° C. The powder is dissolved in dimethyl formamide and precipitated with ether whereby 130 mg. of flakes are obtained of M.P. 210–215° C. Yield 24% of the theoretical. The protected octapeptide is difficultly soluble in most customary solvents but easily soluble in dimethyl formamide.

The L-valyl - L-tyrosyl - L - leucyl-L-histidyl-L-prolyl-L-phenylalanine methyl ester used as starting material is prepared as described in Example 47.

Example 53.—L-asparaginyl-L-lysyl-L-valyl-L-tyrosyl-L-leucyl-L-histidyl-L-propyl-L-phenylalanine methyl ester tribromide 53 mg. (41 μmol) of N-carbobenzyloxy-L-asparaginyl-(Nε-carbobenzyloxy) - L - lysyl - L - valyl-L-tyrosyl-L-leucyl-L-histidyl-L-prolyl-L-phenylalanine methyl ester of M.P. 210–215° C. are treated with 0.3 cc. of 2.5 N-HBr in glacial acetic acid and the mixture maintained for 1½ hours at 21° C. with exclusion of moisture, whereby the material slowly passes into solution. Finally the HBr-glacial acetic acid mixture is completely removed under high vacuum at 25° C. bath temperature and the residual resin washed with acetone as a result of which a granular powder is produced. The extremely hygroscopic product is filtered with suction and washed with a little acetone. After drying, 50 mg. of crude L-asparaginyl-L-lyayl-L-valyl - L - tyrosyl - L-leucyl-L-histidyl-L-prolyl-L-phenylalanine methyl ester trihydrobromide of M.P. about 180–220° (with decomposition) are obtained. The crude product is worked up without further purification.

Example 54.—L-asparaginyl-L-lysyl-L-valyl-tyrosyl-L-leucyl-L-histidyl-L-prolyl-L-phenylalanine 34 mg. (27 μmol) of L-asparaginyl-L-lysyl-L-valyl-L-tyrosyl - L - leucyl - L - histidyl-L-prolyl-L-phenylalanine methyl ester trihydrobromide of M.P. 180–220° C. are dissolved in 1 cc. of methanol and 0.1 N-sodium hydroxide solution added dropwise until the pH value of the solution remains at 10–10.5 for 15 minutes. A total quantity of 1.81 cc. of 0.1 N-NaOH are required (6.7 equivalents). Then, by blowing in $CO_2$ the pH is brought to 8, whereupon the methanol is removed under vacuum, the pH of the aqueous solution is brought to 8.5 to 9.0 by addition of a little sodium carbonate solution and the aqueous solution is extracted with 3 portions of n-butanol saturated with water (30, 20, 20 cc.). The butanol extracts are washed once with 3 cc. of ½ saturated $Na_2SO_4$ solution, dried with sodium sulfate and give on evaporation 18 mg. of crude L-asparaginyl-L-lysyl-L-valyl-L-tyrosyl-L-leucyl-L-histidyl-L-prolyl-L-phenylalanine as a colorless, fine-grained residue. The crude produce is taken up in water by treatment 3 times with 3 cc. each time, whereby 4 mg. of impurity difficultly soluble in water can be separated. The aqueous solutions are combined and evaporated and give 14 mg. of residue. This is washed 3 times with dry n-butanol, using 1 cc. each time, whereby a further 1 mg. of fractions more easily soluble in n-butanol can be removed.

On testing for blood pressure raising effect upon rats, the product shows an immediate, distinct increase of the blood pressure, similar to hypertension when applied to rats from which the kidneys have been removed. Compared with noradrenaline the strength of the effect is about ⅒ to ¹⁄₁₅.

Example 55.—N - carbobenzyloxy - L - asparaginyl - (Nε-carbobenzyloxy-)-L-lysine methyl ester To a solution, cooled to 0° C., of 12.0 grams (0.041 mol) of Nε-carbobenzyloxy-L-lysine methyl ester and 8.6 cc. (0.061 mol) of triethylamine in 60 cc. of absolute toluene is added dropwise within 15 minutes with exclusion of moisture a solution likewise cooled to 0° C. of 7.4 grams of 90% diethyl chlorophosphite (0.048 mol) in 20 cc. of absolute toluene. The reaction mixture is then maintained for 2 hours at room temperature whereupon filtration with suction form separated triethylamine hydrochloride follows, then washing with a little absolute toluene and the toluene filtrate is evaporated to dryness under vacuum, whereby the diethyl phosphite amide of the Nε-carbobenzyloxy-L-lysine methyl ester is obtained as a viscid resin (weight 17.0 grams). It is dissolved in 60 cc. of diethyl phosphite, 10.9 grams of dry, finely powdered N-carbobenzyloxy-L-asparagine (0.041 mol) added and the mixture heated for 1 hour to 80° C., whereby the N-carbobenzyloxy-L-asparagine passes into solution in a few minutes. After 1 hour, the diethyl phosphite is completely distilled off under reduced pressure, the residual resin taken up in much ethyl acetate and the ethyl acetate solution washed with dilute hydrochloric acid, water, dilute sodium carbonate solution and water. The ethyl acetate phase, after drying with sodium sulfate and evaporation, leaves 13.0 grams of crude N-carbobenzyloxy-L-asparaginyl - (Nε - carbobenzyloxy - ) - L - lysine methyl ester as a gelatinous mass. After reprecipitation twice from methanol-ether, 8.5 grams of the product are obtained as a flocculent precipitate; M.P. 152–161° C.; yield 38% of the theoretical yield.

Example 56.—N - carbobenzyloxy - L - asparaginyl - (Nε-carbobenzyloxy-)-L-lysine 5.00 grams (0.0092 mol) of N-carbobenzyloxy-L-asparaginyl-(Nε-carbobenzyloxy-)-L-lysine methyl ester of M.P. 152–161° C. are dissolved in 60 cc. of dimethyl formamide and 0.1 N-caustic soda solution added in portions until the pH value of the solution remains at 10–10.5 for 20 minutes (a total quantity of 140 cc. of 0.1 N-NaOH added). Then by the addition of a little solid $CO_2$ the pH value is brought to 8 and the dimethyl formamide-water mixture concentrated first under vacuum and then under high vacuum to a small volume. The residue is treated with water whereby the sodium salt of N-carbobenzyloxy-L-asparaginyl-(Nε-carbobenzyloxy-)-L - lysine is precipitated as a thick, gelatinous mass. It is brought into solution by the addition of much water (about 200 cc.) filtered from insoluble matter and the filtrate brought to pH=1 by dropwise addition of concentrated hydrochloric acid with ice cooling. The flocculent precipitate is filtered with suction, washed with ice water, dried and recrystallized twice from methanol-ether. 3.2 grams are obtained of N-carbobenzyloxy-L-asparaginyl-(Nε-carbobenzyloxy-)-L-lysine (fine needles) of M.P. 175–181° C. (yield 74% of the theoretical yield). The product is soluble in very dilute alkalies; with 2 N-sodium hydroxide solution or sodium carbonate solution, a gelatinous, difficultly soluble sodium salt is produced.

Example 57.—N - carbobenzyloxy - L - asparaginyl - nitro-L - arginyl - L - leucyl - L - tyrosyl - L - isoleucyl - L-histidyl-L-prolyl-L-phenylalanine methyl ester To a solution of 802 mg. (1 mmol) of L-leucyl-L-tyrosyl - L - isoleucyl - L - histidyl - L - prolyl - L - phenylalanine methyl ester (see Examples 62 and 63 below) in 6 ml. of freshly distilled dimethyl formamide are added 360 mg. 1.5 mmol) of dicyclohexyl-carbodiimide and after a short time 710 mg. (1.5 mmol) of N-carbobenzyloxy-L-asparaginyl-nitro-L-arginine (see Example 2) in 6 mg. of dimethyl formamide. Reaction is allowed to continue overnight at room temperature followed by filtration from dicyclohexyl urea and evaporation of the solvent under high vacuum at 40° C. The foamy residue is dried for a further hour at 40° C. under 0.01 mm. pressure and is then ground with much ethyl acetate and the pulverulent product dried again under high vacuum. For further purification, the crude product is repeatedly washed with much acetone and ice cold methanol. 280 mg. (22%) are obtained of N-carbobenzyloxyoctapeptide methyl ester; M.P. 204–206° C.

Example 58.—L - asparaginyl - L - arginyl - L - leucyl - L-tyrosyl - L - isoleucyl - L - histidyl - L - prolyl - L-phenylalanine methyl ester-trihydrochloride 210 mg. (0.22 mmol) of N-carbobenzyloxy-L-asparaginyl - nitro - L - arginyl - L - leucyl - L - tyrosyl - L-iso - leucyl - L - histidyl - L - prolyl - L - phenylalanine methyl ester are hydrogenated under normal conditions in 30 ml. of absolute methanol in the presence of four equivalents of hydrochloric acid and 200 mg. of palladium charcoal (10% Pd). (The $CO_2$ formed is absorbed in dilute caustic soda solution in a second hydrogenating vessel.) After about 17 hours, somewhat more than the calculated quantity of hydrogen has been taken up. The catalyst is filtered off, the solution evaporated at 40° C. to a small volume and much ether added. By this means the trihydrochloride of the octapeptide ester separates together with ammonium chloride as a white granular product. Yield 240 mg. (270 mg. calculated for trihydrochloride and equimolar quantity of ammonium chloride).

The product is worked up further without additional purification. It is of good solubility in methanol, ethanol and water.

*Example 59.—L - asparagyl - L - arginyl - L - leucyl - L-tyrosyl - L - isoleucyl - L - histidyl - L - prolyl - L phenylalanine*

100 mg. of L-asparaginyl-L-arginyl-L-leucyl-L-tyrosyl-L - isoleucyl - L - histidyl - L - prolyl - L - phenylalanine methyl ester in 2 ml. of pure concentrated hydrochloric acid are maintained for 85 minutes at 37° C. The hydrochloric acid is rapidly vaporised off under vacuum at 25° C. and the residue dried over sodium hydroxide and phosphorus pentoxide.

For purification, the foamy crude product is dissolved with gentle heating in 1.5 ml. of ethanol and the octapeptide trihydrochloride precipitated with 8 ml. of acetone. Centrifuging and washing of the residue with two portions each of 2 ml. of acetone give 90 mg. of L-asparagyl-L-arginyl-L-leucyl - L - tyrosyl - L - isoleucyl - L - histidyl - L - prolyl - L - phenylalanine trihydrochloride.

This substance exhibits 20 times the activity of noradrenaline when applied to rats from which the kidneys have been removed.

By Craig-distribution or chromstography on paper powder in suitable solvent mixtures (for example butanol-methanol-0.33 molar NH$_4$—COOH or secondary butanol-3% NH$_3$ 120:44) L - asparagyl - L - arginyl - L - leucyl-L - tyrosyl - L - isoleucyl-L-histidyl-L-prolyl-L-phenylalanine can be separated from L - asparaginyl - L - arginyl-L-leucyl-L-tyrosyl - L - isoleucyl - L - histidyl-L-prolyl-L-phenylalanine.

*Example 60.—N-carbobenzyloxy-L-leucyl-L-tyrosine methyl ester*

940 mg. (3.5 mmol) of N-carbobenzyloxy - L - leucine are dissolved in 10 ml. of absolute tetrahydrofurane, 800 mg. (10% excess) of dicyclohexyl-carbodiimide are added and then 690 mg. (3.5 mmol) of tyrosine methyl ester dissolved in 15 ml. of absolute tetrahydrofurane. Reaction is allowed to proceed overnight followed by filtration from separated dicyclohexyl urea and evaporation of the solvent under vacuum at 40° C. The evaporation residue in ethyl acetate is washed with N-hydrochloric acid, water, 2N-sodium bicarbonate solution and with water until neutral and the ethyl acetate solution dried over sodium sulfate and the solvent evaporated under vacuum. 1.4 grams (90%) of crude carbobenzoxy-dipeptide ester are isolated. Reprecipitation twice of the crude ester from ethyl acetate-petroleum ether gives pure, but amorphous N-carbobenzyloxy - L - leucyl - L - tyrosine methyl ester. $[\alpha]_D^{22}=-14°\pm4°$ (c.=1.108 in methanol).

The same carbobenzyloxy - L - leucyl - L - tyrosine methyl ester, prepared by the mixed anhydride method has the value $[\alpha]_D^{22}=-11°\pm2°$ (c.=1.631 in ethanol).

*Example 61.—N-carbobenzyloxy-L-leucyl-L-tyrosine*

To 2.37 grams (5.3 mmol) of N-carbobenzyloxy L-leucyl-L-tyrosine methyl ester are added 13.5 ml. of N—NaOH, the whole is shaken until complete solution occurs (5 minutes) and hydrolysis is carried out for 1 hour at room temperature. The alkaline solution is extracted once with 5 ml. of ethyl acetate, the organic phase washed once with a little water and the combined aqueous solutions freed from ethyl acetate by treatment under vacuum for 10 minutes. The carbobenzoxy-dipeptide is precipitated with 13.5 ml. of N—HCl as a sticky mass which solidifies in a refrigerator but melts again at room temperature. The mother liquor is removed by decantation and the rubber-like residue is well washed with water three times and dried over caustic potash and phosphorus pentoxide under high vacuum. 1.9 grams (80%) of amorphous carbobenzyloxy-L-leucyl-L-tyrosine are obtained, which could not be crystallized. Multiplicative distribution (Craig original process) over 30 stages between 80% methanol as upper phase and chloroform:carbon tetrachloride 1:1 as lower phase ($k=1.54$) likewise does not give a crystalline product.

*Example 62.—N-carbobenzyloxy-L-leucyl-L-tyrosyl-L-isoleucyl-L-histidyl-L-prolyl-L-phenylalanine methyl ester*

A solution of 1.03 grams (2.4 mmol) of N-carbobenzyloxy-L-leucyl-L-tyrosine in 10 ml. of dry acetonitrile is treated with 520 mg. (5%) excess of dicyclohexyl-carbodiimide and a solution of 1.38 grams (2.5 mmol) of L-isoleucyl-L-histidyl-L - prolyl - L - phenylalanine methyl ester (see Example 15) in 10 ml. of acetonitrile. As a result the dicyclohexyl urea separates out momentarily. After about 6 hours the separation of the N-carbobenzoxy-hexapeptide ester commences as a gelatinous mass. The whole is allowed to stand for 2 days at room temperature in the dark and then the acetonitrile is evaporated off at 40° C. under reduced pressure. The residue is digested with 5 ml. of ice cold methanol, filtered from dicyclohexyl urea with washing 3 further times with 1 ml. each time of ice cold methanol. The methanol is evaporated under vacuum and the residue taken up in chloroform and washed 3 times with 2 ml. of 2 N-hydrochloric acid, 5 times with 2 ml. of ice cold sodium bicarbonate solution and with water.

The solution, dried over sodium sulfate, is boiled for a short time with a little active charcoal, filtered and the chloroform completely evaporated. A single reprecipitation from chloroform/ether gives 1.7 grams (78%) of carbobenzoxyhexapeptide methyl ester.

A preparation for analysis, after reprecipitation 3 times from chloroform/ether melts at 139–141° C.;

$$[\alpha]_D^{22}=-51°\pm4°$$

(c.=1.87 in methanol).

*Example 63.—L-leucyl-L-tyrosyl-L-isoleucyl-L-histidyl-L-prolyl-L-phenylalanine methyl ester*

1.2 grams (1.28 mmol) of N-carbobenzyloxy - L - leucyl-L-tyrosyl-L-isoleucyl - L - histidyl - L - prolyl - L-phenylalanine methyl ester are hydrogenolytically split up in 20 ml. of absolute methanol, containing 2 equivalents of hydrochloric acid, in the presence of 300 mg. of Pd-charcoal (10% Pd). After 2 hours, somewhat more than the calculated quantity of hydrogen has been taken up. The solution, freed from catalyst, is evaporated to dryness under vacuum at 40° C., the residue is dissolved in 10 ml. of ice cold water and to the clear solution 2.6 mmol of sodium carbonate, dissolved in 10 ml. of water, are added. The separated hexapeptide ester is extracted first with 25 ml. and then twice with 10 ml. of n-butanol/chloroform 1:1, and the aqueous phases washed 3 times with 5 ml. of water, dried over sodium sulfate and concentrated under vacuum to a small volume. By addition of much ether, the hexapeptide ester is precipitated quantitatively. A single reprecipitation from chloroform/ether gives 840 mg. (81%) of amorphous product of M.P. 130–140° C. The product is sufficiently pure for further working up.

What is claimed is:

1. A member of the group consisting of N-carbobenzoxy - L - asparaginyl - nitro-L-arginine and its methyl ester.

2. A member of the group consisting of N-carbobenzoxy-L-valyl-L-tyrosine, its lower alkyl esters, N - carbobenzoxy-L-valyl-O-benzoyl-L-tyrosine ethyl ester and L-valyl-L-tyrosine methyl ester.

3. A member of the group consisting of N-carbobenzoxy-L-valyl-L-histidine methyl ester and L-valyl-L-histidine methyl ester.

4. A member of the group consisting of N-carbobenzoxy-L-prolyl-L-phenylalanine, its methyl and its para-nitrophenyl ester and L-prolyl-L-phenylalanine methyl ester.

5. A member of the group consisting of N-carbobenzoxy-L-isoleucyl-L-histidine methyl ester and N-carbobenzoxy-L-isoleucyl-L-histidine hydrazide.

6. A member of the group consisting of N-carbobenzoxy-L-leucyl-L-histidine methyl ester and N-carbobenzoxy-L-leucyl-L-histidine hydrazide.

7. A member of the group consisting of N-carbobenzoxy-L-leucyl-L-tyrosine and its methyl ester.

8. A member of the group consisting of N-carbobenzoxy-L-valyl-L-tyrosyl-L-valine and its methyl ester.

9. A member of the group consisting of N-marbobenzoxy-L-prolyl-L-phenylalanyl-L - histidine and its methyl ester.

10. A member of the group consisting of N-carbobenzoxy-L-valyl - L - tyrosyl-L-valyl-L-histidine, its methyl ester, and L-valyl-L-tyrosyl - L - valyl - L - histidyl-methyl ester.

11. A member of the group consisting of N-carbobenzoxy - L - prolyl - L - phenylalanyl-L-histidyl-L-leucine methyl ester and L - prolyl - L - phenylalanyl-L-histidyl-L-leucine methyl ester.

12. A member of the group consisting of N-carbobenzoxy-L-iso-leucyl-L-histidyl - L - prolyl - L - phenylalanine methyl ester and L-isoleucyl - L - histidyl - L - prolyl-L-phenylalanine methyl ester.

13. A member of the group consisting of N-carbobenzoxy - L - leucyl - L - histidyl-L-prolyl-L-phenylalanine methyl ester and L - leucyl-L-histidyl - L - prolyl-L-phenylalanine methyl ester.

14. A member of the group consisting of N-carbobenzoxy - L - asparaginyl - nitro-L-arginyl-L-valyl-L-tyrosyl-L-valyl-L-histidine and its methyl ester.

15. A member of the group consisting of N-carbobenzoxy - L - valyl - L - tyrosyl-L-valyl-L-histidyl-L-prolyl-L-phenylalanine methyl ester and L - valyl - L - tyrosyl-L-valyl-L-histidyl-L-prolyl-L-phenylalanine methyl ester.

16. A member of the group consisting of N-carbobenzoxy-L-valyl - L - tyrosyl - L - leucyl-L-histidyl-L-prolyl-L-phenylalanine methyl ester and L - valyl - L - tyrosyl-L-leucyl-L-histidyl-L-prolyl-L-phenylalanine methyl ester.

17. A member of the group consisting of N-carbobenzoxy - L - leucyl - L - tyrosyl-L-isoleucyl-L-histidyl-L-prolyl - L - phenylalanine methyl ester and L-leucyl-L-tyrosyl-L-isoleucyl - L - histidyl-L-prolyl-L-phenylalanine methyl ester.

18. A member of the group consisting of N-carbobenzoxy - L - valyl - L - tyrosyl-L-valyl-L-histidyl-L-prolyl-L-phenylalanyl - L - histidyl-L-leucine methyl ester and L-valyl - L - tyrosyl - L - valyl - L - histidyl-L-prolyl-L-phenylalanyl-L-histidyl-L-leucine methyl ester.

References Cited by the Examiner

UNITED STATES PATENTS 2,978,444  4/1961  Schwyzer _____ 260—112

OTHER REFERENCES

Anson, Advances in Protein Chemistry, vol. 5, pp. 1–75 (1949).

LEWIS GOTTS, *Primary Examiner.*

LEON ZITVER, *Examiner.*

D. P. CLARKE, *Assistant Examiner.*